(12) United States Patent
Kusashima et al.

(10) Patent No.: US 12,273,943 B2
(45) Date of Patent: Apr. 8, 2025

(54) COMMUNICATION DEVICE AND COMMUNICATION METHOD

(71) Applicant: SONY GROUP CORPORATION, Tokyo (JP)

(72) Inventors: Naoki Kusashima, Tokyo (JP); Ryota Kimura, Tokyo (JP); Ryo Sawai, Tokyo (JP); Kyoya Teramae, Kyoto (JP); Keiichi Mizutani, Kyoto (JP); Hiroshi Harada, Kyoto (JP)

(73) Assignee: SONY GROUP CORPORATION, Tokyo (JP)

( * ) Notice: Subject to any disclaimer, the term of this patent is extended or adjusted under 35 U.S.C. 154(b) by 486 days.

(21) Appl. No.: 17/595,356

(22) PCT Filed: Apr. 30, 2020

(86) PCT No.: PCT/JP2020/018354
§ 371 (c)(1),
(2) Date: Nov. 15, 2021

(87) PCT Pub. No.: WO2020/235327
PCT Pub. Date: Nov. 26, 2020

(65) Prior Publication Data
US 2022/0322472 A1    Oct. 6, 2022

(30) Foreign Application Priority Data
May 22, 2019   (JP) ................. 2019-096391

(51) Int. Cl.
*H04W 76/15* (2018.01)
*H04W 52/14* (2009.01)
*H04W 72/23* (2023.01)

(52) U.S. Cl.
CPC ......... *H04W 76/15* (2018.02); *H04W 52/143* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 11,997,688 B2 * | 5/2024 | Liu | H04W 72/23 |
| 2018/0270816 A1 * | 9/2018 | Li | H04B 7/2656 |

(Continued)

FOREIGN PATENT DOCUMENTS

| | | |
|---|---|---|
| CN | 109429349 A | 3/2019 |
| CN | 109673050 A | 4/2019 |

(Continued)

OTHER PUBLICATIONS

International Search Report and Written Opinion of PCT Application No. PCT/JP2020/018354, issued on Jul. 28, 2020, 09 pages of ISRWO.

(Continued)

*Primary Examiner* — Otis L Thompson, Jr.
(74) *Attorney, Agent, or Firm* — CHIP LAW GROUP

(57) ABSTRACT

Disclosed is a communication device that includes a communication unit and a notification unit. The communication unit, while wirelessly communicating in a first communication mode using a first resource of a predetermined frequency channel, wirelessly communicates in a second communication mode in which a lower delay is required than in the first communication mode using a second resource at least partially overlapping the first resource on a frequency axis and a time axis. The notification unit notifies a reception destination in the first communication mode, of the second resource.

12 Claims, 11 Drawing Sheets

(56) References Cited

U.S. PATENT DOCUMENTS

| | | | |
|---|---|---|---|
| 2019/0053084 A1* | 2/2019 | Hosseini | H04L 5/0094 |
| 2019/0158240 A1* | 5/2019 | Li | H04L 5/0053 |
| 2019/0268938 A1* | 8/2019 | Zhao | H04W 74/02 |
| 2019/0364563 A1* | 11/2019 | Jung | H04W 72/0446 |
| 2019/0379487 A1 | 12/2019 | Hwang et al. | |
| 2020/0313732 A1* | 10/2020 | Yang | H04W 72/0473 |
| 2020/0351932 A1* | 11/2020 | Tsai | H04L 1/0038 |
| 2021/0014036 A1* | 1/2021 | Chen | H04L 5/0094 |

FOREIGN PATENT DOCUMENTS

| | | |
|---|---|---|
| CN | 110235401 A | 9/2019 |
| CN | 110249676 A | 9/2019 |
| EP | 3567774 A1 | 11/2019 |
| EP | 3579641 A1 | 12/2019 |
| JP | 2020-502939 A | 1/2020 |
| JP | 2020-506641 A | 2/2020 |
| KR | 10-2018-0099875 A | 9/2018 |
| KR | 10-2019-0090868 A | 8/2019 |
| WO | 2015/045555 A1 | 4/2015 |
| WO | WO-2018028076 A1 | 2/2018 |
| WO | 2018/128363 A1 | 7/2018 |
| WO | 2018/143689 A1 | 8/2018 |
| WO | WO-2018174644 A1 | 9/2018 |

OTHER PUBLICATIONS

NEC, "UL inter-UE Tx prioritisation and multiplexing", 3GPP TSG RAN WG1 Number #96, R1-1902532, Athens, Greece, Mar. 1, 2019, 4 pages.

LG Electronics, "Discussion on UL inter UE Tx prioritization", 3GPP TSG RAN WG1 Meeting #95, R1-1812577, Spokane, USA, Nov. 12-16, 2018, 12 pages.

* cited by examiner

COMMUNICATION DEVICE AND COMMUNICATION METHOD

CROSS REFERENCE TO RELATED APPLICATIONS

This application is a U.S. National Phase of International Patent Application No. PCT/JP2020/018354 filed on Apr. 30, 2020, which claims priority benefit of Japanese Patent Application No. JP 2019-096391 filed in the Japan Patent Office on May 22, 2019. Each of the above-referenced applications is hereby incorporated herein by reference in its entirety.

FIELD

The present disclosure relates to a communication device and a communication method.

BACKGROUND

In recent years, in the 5G, besides the enhanced Mobile Broadband (eMBB) for data communication of conventional smartphones, for example, communication modes such as the Ultra-Reliable and Low Latency Communication (URLLC) in which high reliability and low delay are required, such as emergency message transmission used for automatic driving, are assumed to be supported by one wireless system.

CITATION LIST

Patent Literature

Patent Literature 1: WO 2015/045555 A

SUMMARY

Technical Problem

However, in the wireless system, for example, even if a URLLC transmission request for which a low delay is required occurs during an eMBB reception, it is necessary to wait for the URLLC transmission until the eMBB reception is completed. As a result, the quality of service (QoS) of URLLC cannot be satisfied.

Therefore, the present disclosure proposes a communication device and a communication method capable of satisfying the requirements of a communication mode in which a low delay is required.

Solution to Problem

To solve the above problem, a communication device according to the present disclosure includes: a communication unit that, while wirelessly communicating in a first communication mode using a first resource of a predetermined frequency channel, wirelessly communicates in a second communication mode in which a lower delay is required than in the first communication mode using a second resource at least partially overlapping the first resource on a frequency axis and a time axis; and a notification unit that notifies a reception destination in the first communication mode, of the second resource.

DESCRIPTION OF EMBODIMENTS

Figure 1:
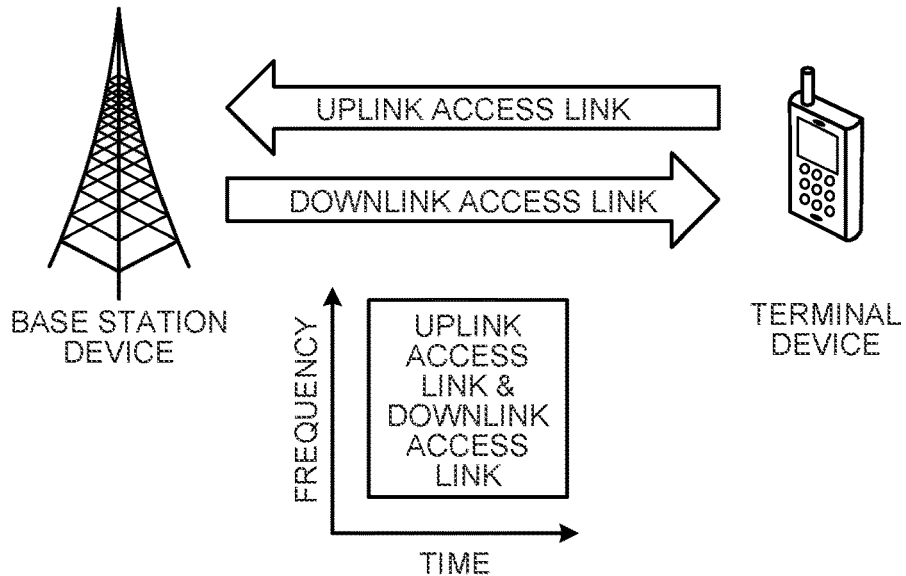
FIG. 1 is a diagram illustrating an overview of in-band full-duplex communication.

Hereinafter, embodiments of the present disclosure will be described in detail with reference to the drawings. In the following embodiments, the same parts are denoted by the same reference numerals, and redundant description thereof will be omitted.

In addition, in the present specification and the drawings, a plurality of components having substantially the same functional configuration may be distinguished from one another by affixing different numbers to the same reference numeral. For example, a plurality of components having substantially the same functional configuration is distinguished from one another as terminal devices $40_1$, $40_2$, and $40_3$ as necessary. However, when it is not particularly necessary to distinguish the plurality of components having substantially the same functional configuration, they are denoted with only the same reference numeral. For example, when it is not particularly necessary to distinguish the terminal devices $40_1$, $40_2$, and $40_3$, they are simply referred to as terminal devices 40.

The present disclosure will be described according to the following item order.

1. Introduction 1-1. Overview of In-Band Full-Duplex Communication
1-2. Communication Method of eMBB and URLLC Using TDD
1-3. Communication Method of eMBB and URLLC Using In-band Full-duplex Communication
2. Configuration of Communication System
2-1. Overall Configuration of Communication System
2-2. Configuration of Management Device
2-3. Configuration of Base Station Device
2-4. Configuration of Relay Device
2-5. Configuration of Terminal Device
2-6. Configuration of Assumed System 1A
2-7. Configuration of Assumed System 1B
2-8. Configuration of Assumed System 1C
2-9. Configuration of Assumed System 1D
2-10. Configuration of Assumed System 1E
2-11. Configuration of Assumed System 1F
3. Basic Communication Control
4. eMBB Communication Control
4-1. eMBB Communication Control in Assumed System 1A
4-2. Notification Method of eMBB Resource in Assumed System 1A
4-3. eMBB Communication Control in Assumed System 1B
4-4. Notification Method of eMBB Resource in Assumed System 1B
4-5. eMBB Communication Control in Assumed System 1C
4-6. Notification Method of eMBB Resource in Assumed System 1C
4-7. eMBB Communication Control in Assumed System 1D
4-8. Notification Method of eMBB Resource in Assumed System 1D
5. URLLC Communication Control
5-1. Boosting URLLC Transmission Power
5-2. URLLC Communication Control in Assumed System 1E
5-3. URLLC Communication Control in Assumed System 1E
6. Modifications
7. Conclusion

1. INTRODUCTION

With a rapid increase in mobile traffic in recent years, innovative technologies for improving frequency utilization efficiency have been actively studied. As one of representative techniques, in-band full-duplex communication is considered. In conventional full-duplex communication, communication is performed using different frequencies in a transmission band and a reception band in order to avoid interference between a transmission signal and a reception signal. On the other hand, the in-band full-duplex communication is a duplex system in which transmission and reception are simultaneously performed using the same frequency band. In the in-band full-duplex communication, a signal transmitted by a communication device leaks into a reception circuit of the communication device, thereby causing very strong self-interference. However, the progress of interference cancellation technology has made it possible to reduce self-interference.

<1-1. Overview of In-Band Full-Duplex Communication>

FIG. 1 is a diagram illustrating an overview of in-band full-duplex communication. The uplink access link and the downlink access link between a base station device and a terminal device illustrated in FIG. 1 adopt in-band full-duplex communication capable of simultaneous transmission and reception using the same frequency band. As a result, in the in-band full-duplex communication, since transmission and reception can be simultaneously performed using the same frequency band, the frequency utilization efficiency can be improved up to twice as compared with the conventional full-duplex communication.

Figure 2:
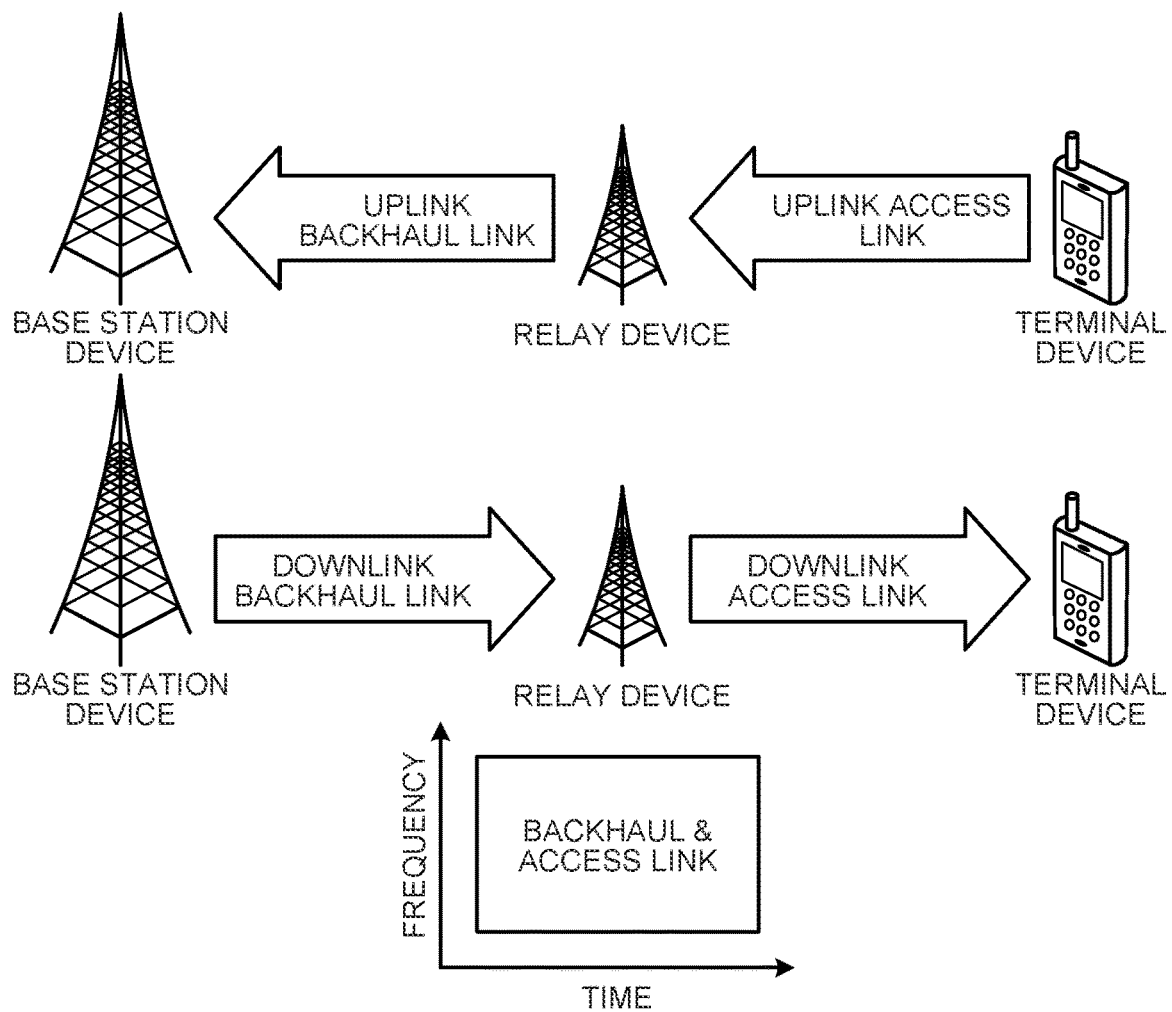
FIG. 2 is a diagram illustrating an example of backhaul links and access links of in-band full-duplex communication.

FIG. 2 is a diagram illustrating an example of backhaul links and access links of in-band full-duplex communication. The wireless link between a base station device and a relay device illustrated in FIG. 2 is a backhaul link, and the wireless link between the relay device and the terminal device is an access link. The backhaul link includes an uplink backhaul link from the relay device to the base station device and a downlink backhaul link from the base station device to the relay device. The access link further includes an uplink access link from the terminal device to the relay device and a downlink access link from the relay device to the terminal device.

It has been studied to mount a self-interference canceller in a relay device that relays between a backhaul link and an access link, and to adopt in-band full-duplex communication between the backhaul link and the access link. As a result, in addition to improving the frequency utilization efficiency, it is possible to reduce a packet transmission delay caused by passing through the relay device.

In addition, in the 5G, besides the enhanced Mobile Broadband (eMBB) for data communication of conventional smartphones, communication modes such as the Ultra-Reliable and Low Latency Communication (URLLC) in which high reliability and low delay are required, such as emergency message transmission used for automatic driving, are assumed to be supported by one wireless system.

<1-2. Communication Method of eMBB and URLLC Using Time Division Duplex (TDD)>

Figure 3:
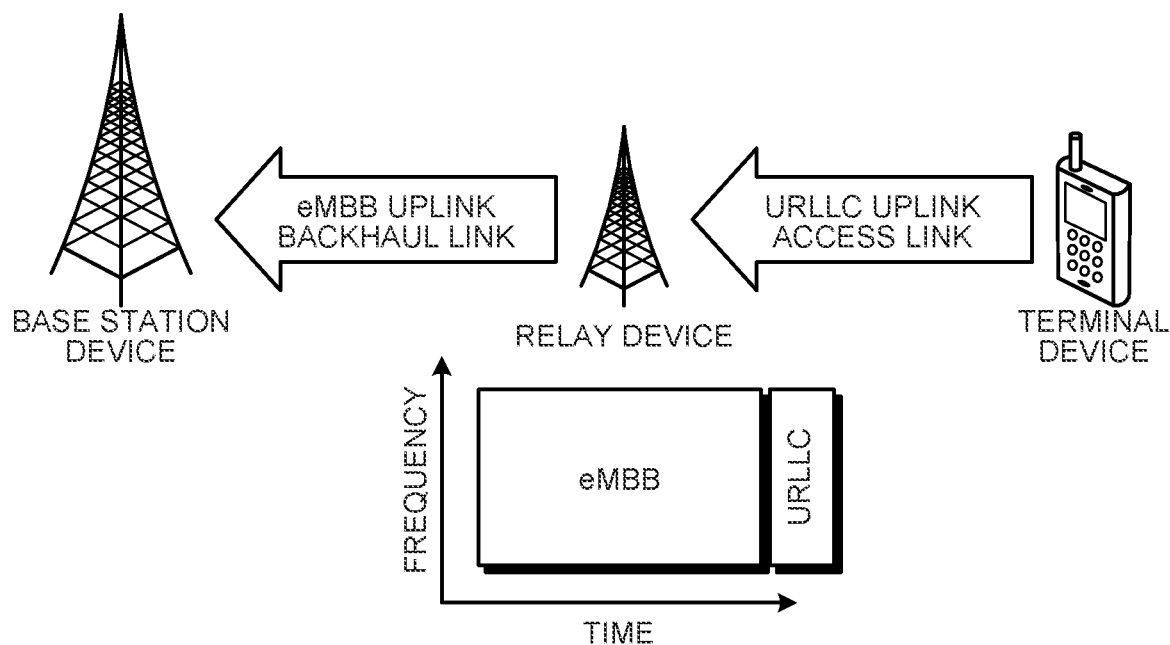
FIG. 3 is a diagram illustrating an example of a communication method of eMBB and URLLC using TDD.

FIG. 3 is a diagram illustrating an example of a communication method of eMBB and URLLC using TDD. TDD is a duplex system that enables bidirectional communication by allocating different times using the same frequency band to the uplink and the downlink. In a wireless system that employs TDD for a backhaul link and an access link, data cannot be transmitted simultaneously with data reception, which causes a delay. For example, even if a URLLC transmission request for which a low delay is required occurs during an eMBB reception, it is necessary to wait for the URLLC transmission until the eMBB reception is completed. Therefore, it is considered that the QoS of URLLC cannot be satisfied. That is, it is required to satisfy the requirements of the first communication mode such as eMBB and the second communication mode such as URLLC while improving the frequency utilization efficiency.

Therefore, in the present embodiment, this issue is solved by the following means.

For example, a relay device that is a communication device includes: a communication unit that, while wirelessly communicating, for example, eMBB in a first communication mode using a first resource of a predetermined frequency channel, wirelessly communicates, for example, URLLC in a second communication mode in which a lower delay is required than in the first communication mode using a second resource at least partially overlapping the first resource on a frequency axis and a time axis; and a notification unit that notifies a reception destination in the first communication mode, of the second resource.

Figure 4:
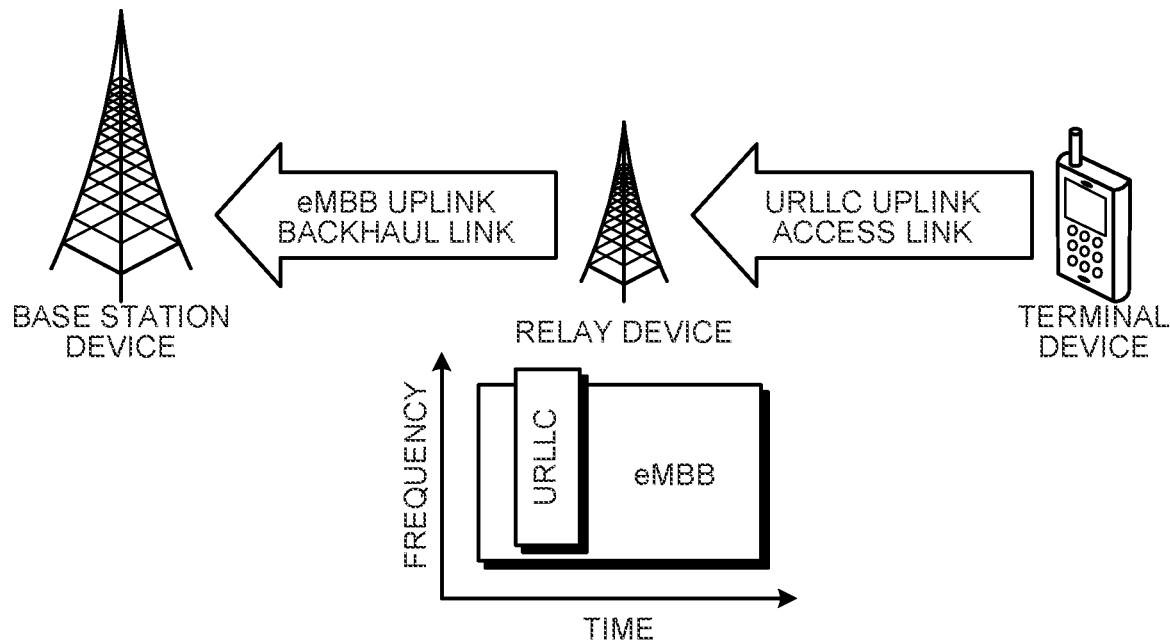
FIG. 4 is a diagram illustrating an example of a communication method of eMBB and URLLC using in-band full-duplex communication.

FIG. 4 is a diagram illustrating an example of a communication method of eMBB and URLLC using in-band full-duplex communication. In the relay device to which the features of the in-band full-duplex communication are applied, for example, a communication system is assumed in which the uplink access link URLLC is received using the resource of the same frequency band and the same timing among the resources for the eMBB transmission in the uplink backhaul link. In this communication system, the URLLC resource can be superimposed on the eMBB resource. That is, the relay device performs wireless communication of the URLLC using the second resource at least partially overlapping the first resource on the frequency axis and the time axis while performing wireless communication of the eMBB using the first resource of the predetermined frequency channel. The relay device notifies the base station device or the terminal device that is the reception destination of the eMBB, of the second resource. As a result, it is possible to reduce the delay time due to waiting for URLLC transmission and satisfy the requirements of URLLC while performing the in-band duplex communication of eMBB and URLLC. Further, the reception destination of the eMBB can recognize the first resource of the eMBB overlapping the second resource of the URLLC. That is, it is possible to satisfy the requirements of the first communication mode such as eMBB and the second communication mode such as URLLC while improving the frequency utilization efficiency.

The overview of the present embodiment has been described above. Hereinafter, a communication system 1 of the present embodiment will be described in detail below.

2. CONFIGURATION OF COMMUNICATION SYSTEM

The communication system 1 includes a base station device and a relay device, and can wirelessly connect to a terminal device. Hereinafter, the configuration of the communication system 1 will be specifically described.

<2-1. Overall Configuration of Communication System>

Figure 5:
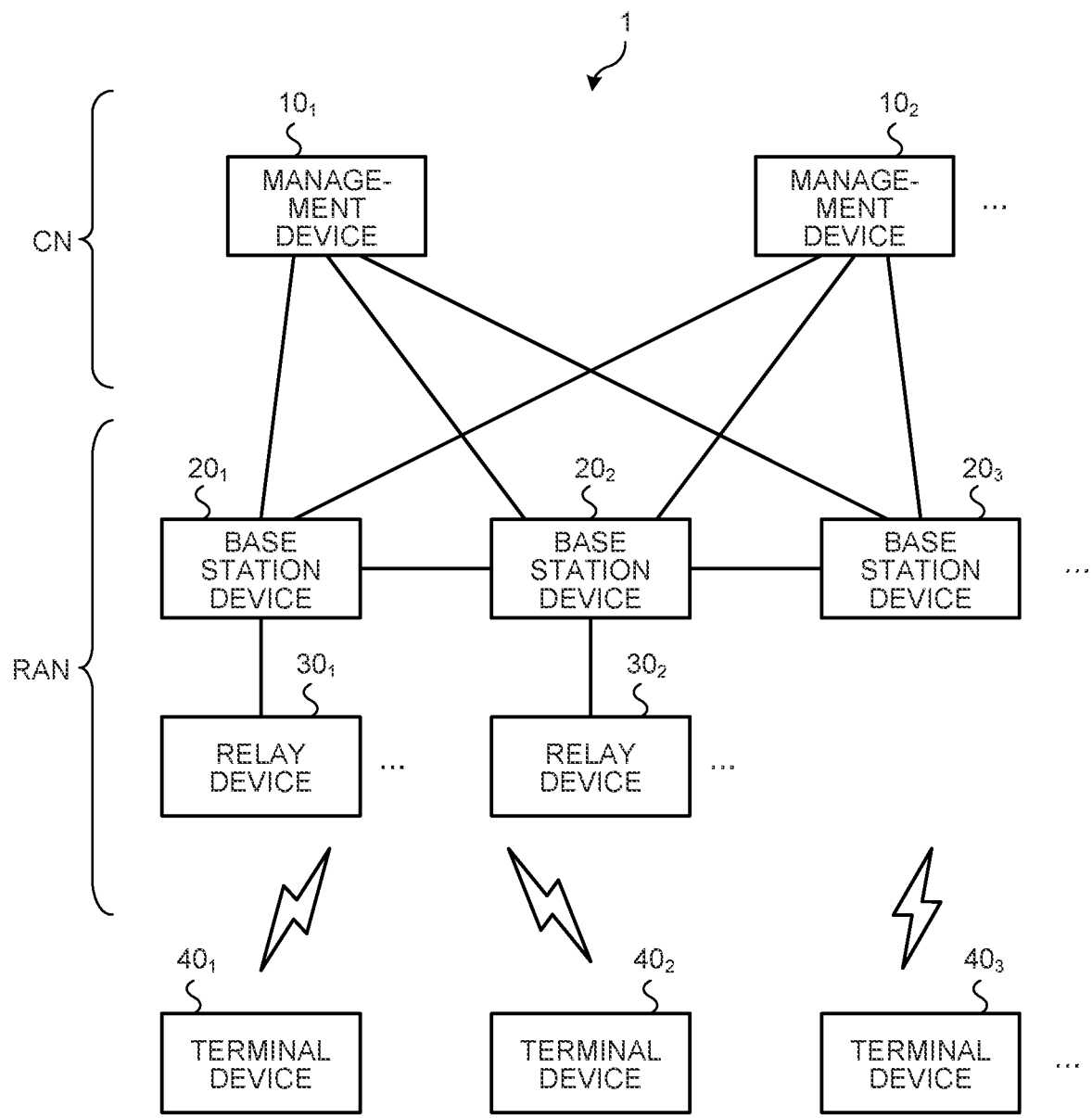
FIG. 5 is a diagram illustrating a configuration example of a communication system according to an embodiment of the present disclosure.

FIG. 5 is a diagram illustrating a configuration example of the communication system 1 according to an embodiment of the present disclosure. The communication system 1 is a wireless communication system that provides a terminal device with a radio access network. For example, the communication system 1 is a cellular communication system using a radio access technology such as Long Term Evolution (LTE) or New Radio (NR).

As illustrated in FIG. 5, the communication system 1 includes a management device 10, a base station device 20, a relay device 30, and a terminal device 40. The communication system 1 provides the user with a wireless network capable of mobile communication by the wireless communication devices constituting the communication system 1 operating in cooperation. The wireless network of the present embodiment includes a radio access network RAN and a core network CN. The wireless communication devices refer to devices having a wireless communication function, and correspond to the base station device 20, the relay device 30, and the terminal device 40 in the example of FIG. 5.

The communication system 1 may include a plurality of management devices 10, a plurality of base station devices 20, a plurality of relay devices 30, and a plurality of terminal devices 40. In the example of FIG. 5, the communication system 1 includes management devices $10_1$, $10_2$, and the like, as the management devices 10. The communication system 1 also includes base station devices $20_1$, $20_2$, $20_3$, and the like, as the base station devices 20, and includes relay devices $30_1$, $30_2$, and the like, as the relay devices 30. The communication system 1 also includes terminal devices $40_1$, $40_2$, $40_3$, and the like, as the terminal devices 40.

The devices in the drawings may be considered as devices in a logical sense. That is, some of the devices in the drawing may be realized by virtual machines (VM), containers, dockers, or the like, and they may be implemented on physically the same hardware.

An LTE base station may be referred to as an evolved node B (eNodeB) or an eNB. An NR base station may be referred to as a gNodeB or a gNB. In LTE and NR, a terminal device (also referred to as a mobile station, a mobile station device, or a terminal) may be referred to as user equipment (UE). The terminal device is a type of communication device, and is also referred to as a mobile station, mobile station device, or terminal.

In the present embodiment, the concept of a communication device includes not only a portable mobile device (terminal device) such as a mobile terminal but also a device installed in a structure or a mobile body. A structure or a mobile body itself may be regarded as a communication device. In addition, the concept of a communication device includes not only a terminal device but also a base station device and a relay device. The communication device is a type of processing device and information processing device. Furthermore, the communication device can be rephrased as a transmission device or a reception device.

[Management Device]

The management device 10 is a device that manages a wireless network. For example, the management device 10 is a device that manages communication of the base station device 20. For example, the management device 10 is a device that serves as a mobility management entity (MME), an access and mobility management function (AMF), or a session management function (SMF).

The management device 10 constitutes a core network CN together with a gateway device and the like. The core network CN is, for example, a network of a predetermined entity such as a mobile communication carrier. For example, the core network CN is an evolved packet core (EPC) or a 5G core network (5GC). The predetermined entity may be the same as or different from an entity that uses, operates, and/or manages the base station device 20.

The management device 10 may have a function of a gateway. For example, when the core network is an EPC, the management device 10 may have a function of an S-GW or a P-GW. When the core network is a 5GC, the management device 10 may have a function of a user plane function (UPF). The management device 10 is not necessarily a device constituting the core network CN. For example, it is assumed that the core network CN is a core network of Wideband Code Division Multiple Access (W-CDMA) or Code Division Multiple Access 2000 (cdma2000). In this case, the management device 10 may be a device that serves as a radio network controller (RNC).

The management device 10 is connected to each of the plurality of base station devices 20 and manages communication of the base station device 20. For example, the management device 10 manages each of the terminal devices 40, while ascertaining to which base station device (or which cell) the terminal device 40 is connected, in a communication area of which base station device (or which cell) the terminal device exists, and the like. The cell may be a primary cell (pCell) or a secondary cell (sCell). The cells may be different from one another in radio resources that can be used by the terminal device 40 (for example, a frequency channel, a component carrier, or the like). One base station device may provide a plurality of cells.

[Base Station Device]

The base station device 20 is a wireless communication device that wirelessly communicates with the terminal device 40. The base station device 20 is a type of communication device. The base station device 20 is, for example, a device corresponding to a radio base station (base station, node B, eNB, gNB, or the like) or a radio access point. The base station device 20 may be a wireless relay station. The base station device 20 may be an optical extension device called a remote radio head (RRH). The base station device 20 may also be a reception station device such as a field pickup unit (FPU). The base station device 20 may also be an Integrated Access and Backhaul (IAB) donor node or an IAB relay node that provides a radio access line and a radio backhaul line by time division multiplexing, frequency division multiplexing, or space division multiplexing.

The radio access technology used by the base station device 20 may be a cellular communication technology or a wireless LAN technology. Of course, the radio access technology used by the base station device 20 is not limited to these technologies, and may be another radio access technology. The radio access technology used by the base station device 20 may be a low power wide area (LPWA) communication technology. Here, the LPWA communication is communication conforming to the LPWA standard. Examples of the LPWA standard include ELTRES, ZETA, SIGFOX, LoRaWAN, and NB-Iot. Of course, the LPWA standard is not limited to them, and may be another LPWA standard. Otherwise, the wireless communication used by the base station device 20 may be wireless communication using millimeter waves. The wireless communication used by the base station device 20 may be wireless communication using radio waves or wireless communication (optical wireless) using infrared rays or visible light.

The base station device 20 may be able to perform NOMA communication with the terminal device 40. Here, the NOMA communication refers to communication using a non-orthogonal resource (transmission, reception, or both). The base station device 20 may be able to perform NOMA communication with another base station device 20 and the relay device 30.

The base station devices 20 may be able to communicate with each other via a base station device-core network interface (for example, S1 Interface or the like). This interface may be either wired or wireless. The base station devices may be able to communicate with each other via an inter-base station device interface (for example, X2 Interface, S1 Interface, or the like). This interface may be either wired or wireless.

The base station device 20 can be used, operated, and/or managed by various entities. Examples of entity possibly include mobile network operators (MNOs), mobile virtual network operators (MVNOs), mobile virtual network enablers (MVNEs), neutral host network (NHN) business operators, enterprises, educational institutions (educational institutions, boards of local governments, and the like), real estate (buildings, apartments, and the like) administrators, individuals, and the like.

Of course, the entities of use, operation, and/or management of the base station device 20 are not limited to them. The base station device 20 may be installed and/or operated by one business operator, or may be installed and/or operated by one individual. Of course, the entities of installation/operation of the base station device 20 are not limited them. For example, the base station device 20 may be installed and operated by a plurality of business operators or a plurality of individuals in cooperation. The base station device 20 may be a shared facility used by a plurality of business operators or a plurality of individuals. In this case, installation and/or operation of the facility may be performed by a third party different from the user.

The concept of a base station device (also referred to as a base station) includes not only a donor base station but also a relay base station (also referred to as a relay station or a relay station device). The concept of a base station includes not only a structure having a function of the base station but also a device installed in the structure.

The structure is, for example, a building such as skyscraper, house, steel tower, station facility, airport facility, harbor facility, or stadium. The concept of a structure includes not only buildings but also a non-building structures such as tunnel, bridge, dam, fence, and iron pillar, and facilities such as crane, gate, and windmill. The concept of a structure includes not only a structure on land (on the ground in a narrow sense) or a structure underground, but also a structure on water such as a pier or megafloat, and a structure underwater such as a marine observation facility. The base station device can be rephrased as a processing device or an information processing device.

The base station device 20 may be a donor station or a relay station. The base station device 20 may also be a fixed station or a mobile station. The mobile station is a wireless communication device (for example, a base station device) configured to be movable. In this case, the base station device 20 may be a device installed in a mobile body or may be a mobile body itself. For example, a relay station device having mobility can be regarded as the base station device 20 as a mobile station. In addition, a device that is originally capable of moving, such as a vehicle, drone, or smartphone, and has a function of a base station device (at least a part of the function of the base station device) also corresponds to the base station device 20 as a mobile station.

The mobile body may be a mobile terminal such as smartphone or mobile phone. The mobile body may be a mobile body that moves on land (the ground in a narrow sense) (for example, a vehicle such as automobile, bicycle, bus, truck, motorcycle, train, or linear motor car) or a mobile body (for example, a subway) that moves underground (for example, in a tunnel).

The mobile body may be a mobile body that moves over water (for example, a ship such as passenger ship, cargo ship, or hovercraft) or a mobile body that moves under water (for example, a submersible ship such as submersible vessel, submarine, or unmanned underwater vehicle).

The mobile body may be a mobile body that moves inside the atmosphere (for example, an airplane, airship, or aircraft such as a drone) or a mobile body that moves outside the atmosphere (for example, an artificial astral body such as artificial satellite, spacecraft, space station, or probe). The mobile body moving outside the atmosphere can be rephrased as a space mobile body.

The base station device 20 may be a ground base station device (ground station device) installed on the ground. For example, the base station device 20 may be a base station device arranged in a structure on the ground, or may be a base station device installed in a mobile body moving on the ground. More specifically, the base station device 20 may be an antenna installed in a structure such as a building and a signal processing device connected to the antenna. Of course, the base station device 20 may be a structure or a mobile body itself. The "ground" is a ground in a broad sense including not only land (ground in a narrow sense) but also underground, water surface, and underwater. The base station device 20 is not limited to a ground base station device. The base station device 20 may be a non-ground base station device (non-ground station device) capable of floating in the air or space. For example, the base station device 20 may be an aircraft station device or a satellite station device.

The aircraft station device is a wireless communication device capable of floating in the atmosphere, such as an aircraft. The aircraft station device may be a device mounted in an aircraft or the like, or may be an aircraft itself. The concept of an aircraft includes not only heavy aircrafts such as an airplane and a glider but also light aircrafts such as a balloon and an airship. The concept of an aircraft also includes not only heavy aircrafts and light aircrafts but also rotorcrafts such as a helicopter and an autogyroscope. The aircraft station device (or an aircraft in which the aircraft station device is mounted) may be an unmanned aerial vehicle such as a drone.

The concept of an unmanned aerial vehicle also includes an unmanned aircraft system (UAS) and a tethered UAS. The concept of an unmanned aerial vehicle also includes Lighter than Air (LTA) UAS and Heavier than Air (HTA) UAS. Besides, the concept of an unmanned aerial vehicle also includes High Altitude UAS Platforms (HAPs).

The satellite station device is a wireless communication device capable of floating outside the atmosphere. The satellite station device may be a device mounted on a space mobile body such as an artificial satellite, or may be a space mobile body itself. The satellite serving as the satellite station device may be any of a low earth orbiting (LEO) satellite, a medium earth orbiting (MEO) satellite, a geostationary earth orbiting (GEO) satellite, and a highly elliptical orbiting (HEO) satellite. Of course, the satellite station device may be a device mounted on a low earth orbiting satellite, a medium earth orbiting satellite, a geostationary earth orbiting satellite, or a highly elliptical orbiting satellite.

The coverage of the base station device 20 may be as large as a macro cell or as small as a pico cell. Of course, the magnitude of the coverage of the base station device 20 may be as extremely small as a femto cell. The base station device 20 may have a beamforming capability. In this case, the base station device 20 may form a cell or a service area for each beam.

In the example of FIG. 5, the base station device $20_1$ is connected to the relay device $30_1$, and the base station device $20_2$ is connected to the relay device $30_2$. The base station device $20_1$ can indirectly perform wireless communication with the terminal device 40 via the relay device $30_1$. Similarly, the base station device $20_2$ can indirectly perform wireless communication with the terminal device 40 via the relay device $30_2$.

[Relay Device]

The relay device 30 is a device serving as a relay station of a base station. The relay device 30 is a type of base station device. The relay device can be rephrased as a relay base station device (or a relay base station). The relay device 30 can perform NOMA communication with the terminal device 40. The relay device 30 relays communication between the base station device 20 and the terminal device 40. The relay device 30 may be able to perform NOMA communication with another relay device 30 and the base station device 20. The relay device 30 may be a ground station device or a non-ground station device. The relay device 30 constitutes the radio access network RAN together with the base station device 20.

The relay device 30 is a device that transfers information from one communication device to the other communication device. Specifically, the relay device 30 a device that receives a signal from one communication device and transmits a signal to the other communication device. The relay device 30 is assumed to perform wireless communication between one communication device and the relay device 30 and between the relay device 30 and the other communication device. The relay device 30 may be a fixed device, a movable device, or a floatable device. The magnitude of the coverage of the relay device 30 is not limited. For example, the relay device 30 may be a macro cell, a micro cell, or a small cell. The relay device 30 is not limited to the device where the relay device 30 is mounted as long as the function of a relay is satisfied. For example, the relay device 30 may be mounted in the terminal device 40 such as a smartphone, may be mounted in an automobile or a human-powered vehicle, may be mounted in a balloon, an airplane, or a drone, or may be mounted in a home appliance such as a television, game machine, air conditioner, refrigerator, or lighting fixture.

[Terminal Device]

The terminal device 40 is a wireless communication device that wirelessly communicates with the base station device 20 or the relay device 30. The terminal device 40 is, for example, a mobile phone, smart device (smartphone or tablet), personal digital assistant (PDA), or personal computer. The terminal device 40 may be a device such as a business camera provided with a communication function, or may be a motorcycle, moving relay vehicle, or the like in which a communication device such as a field pickup unit (FPU) is mounted. The terminal device 40 may be a Machine to Machine (M2M) device or an Internet of Things (IoT) device.

Furthermore, the terminal device 40 may be capable of sidelink communication with another terminal device 40. The terminal device 40 may be able to use an automatic retransmission technology such as HARQ when performing sidelink communication. The terminal device 40 may be able to perform NOMA communication with the base station device 20 and the relay device 30. The terminal device 40 may also be capable of NOMA communication in communication (sidelink) with another terminal device 40. The terminal device 40 may be able to perform LPWA communication with other communication devices (for example, the base station device 20, the relay device 30, and another terminal device 40). The wireless communication used by the terminal device 40 may be wireless communication using millimeter waves. The wireless communication (including sidelink communication) used by the terminal device 40 may be wireless communication using radio waves or wireless communication (optical wireless) using infrared rays or visible light.

The terminal device 40 may be a mobile device. Here, the mobile device is a movable wireless communication device. In this case, the terminal device 40 may be a wireless communication device installed in a mobile body or may be a mobile body itself. For example, the terminal device 40 may be a vehicle that moves on a road such as an automobile, bus, truck, or motorcycle, or a wireless communication device mounted in the vehicle. The mobile body may be a mobile terminal, or may be a mobile body that moves on land (on the ground in a narrow sense), underground, on water, or underwater. The mobile body may be a mobile body that moves inside the atmosphere, such as a drone or a helicopter, or may be a mobile body that moves outside the atmosphere, such as an artificial satellite.

The terminal device 40 may be simultaneously connected to a plurality of base station devices or a plurality of cells to perform communication. For example, when one base station device supports a communication area via a plurality of cells (for example, pCell, sCell), the base station device 20 and the terminal device 40 can communicate with each other via the plurality of cells bundled by a carrier aggregation (CA) technology, a dual connectivity (DC) technology, or a multi-connectivity (MC) technology. Alternatively, the terminal device 40 and the plurality of base station devices 20 can communicate with each other via cells of the different base station devices 20 by a Coordinated Multi-Point Transmission and Reception (CoMP) technology.

The terminal device 40 is not necessarily a device directly used by a person. The terminal device 40 may be a sensor installed in a machine or the like in a factory like so-called machine type communication (MTC). The terminal device 40 may be a Machine to Machine (M2M) device or an Internet of Things (IoT) device. The terminal device 40 may be a device having a relay communication function as represented by Device to Device (D2D) and Vehicle to Everything (V2X). The terminal device 40 may be a device called client premises equipment (CPE) used for wireless backhaul or the like.

Hereinafter, a configuration of each device constituting the communication system 1 according to the embodiment will be specifically described. Note that the configuration of each device described below is merely an example. The configuration of each device may be different from the following configuration.

<2-2. Configuration of Management Device>

Figure 6:
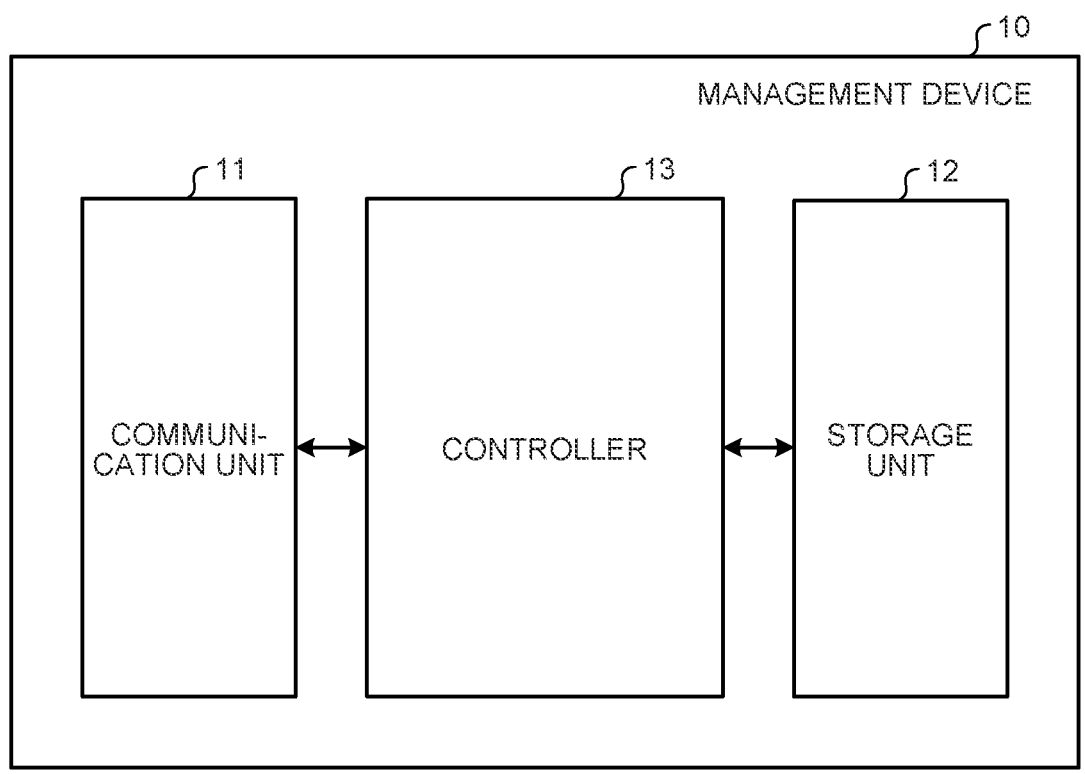
FIG. 6 is a diagram illustrating a configuration example of a management device according to the embodiment of the present disclosure.

FIG. 6 is a diagram illustrating a configuration example of the management device 10 according to the embodiment of the present disclosure. The management device 10 is a device that manages a wireless network. The management device 10 includes a communication unit 11, a storage unit 12, and a controller 13. The configuration illustrated in FIG. 6 is a functional configuration, and the hardware configuration may be different from this functional configuration. The functions of the management device 10 may be implemented in a distributed manner in a plurality of physically separated components. For example, the management device 10 may include a plurality of server devices.

The communication unit 11 is a communication interface for communicating with other devices. The communication unit 11 may be a network interface or a device connection interface. For example, the communication unit 11 may be a local area network (LAN) interface such as a network interface card (NIC), or may be a universal serial bus (USB) interface including a USB host controller, USB port, or the like. The communication unit 11 may be a wired interface or a wireless interface. The communication unit 11 functions as a communication means of the management device 10. The communication unit 11 communicates with the base station device 20 under the control of the controller 13.

The storage unit 12 is a data readable/writable storage device such as a dynamic random access memory (DRAM), a static random access memory (SRAM), a flash memory, or a hard disk. The storage unit 12 functions as a storage means of the management device 10. The storage unit 12 stores, for example, a connection state of the terminal device 40. For example, the storage unit 12 stores a radio resource control (RRC) state and an EPS connection management (ECM) state of the terminal device 40. The storage unit 12 may function as a home memory that stores the position information of the terminal device 40.

The controller 13 is a controller that controls each unit of the management device 10. The controller 13 is realized by, for example, a processor such as a central processing unit (CPU) or a micro processing unit (MPU). For example, the controller 13 is realized by the processor executing various programs stored in the internal storage device of the management device 10 using a random access memory (RAM) or the like as a work area. The controller 13 may be realized by an integrated circuit such as an application specific integrated circuit (ASIC) or a field programmable gate array (FPGA). Any of the CPU, the MPU, the ASIC, and the FPGA can be regarded as a controller.

<2-3. Configuration of Base Station Device>

Figure 7:
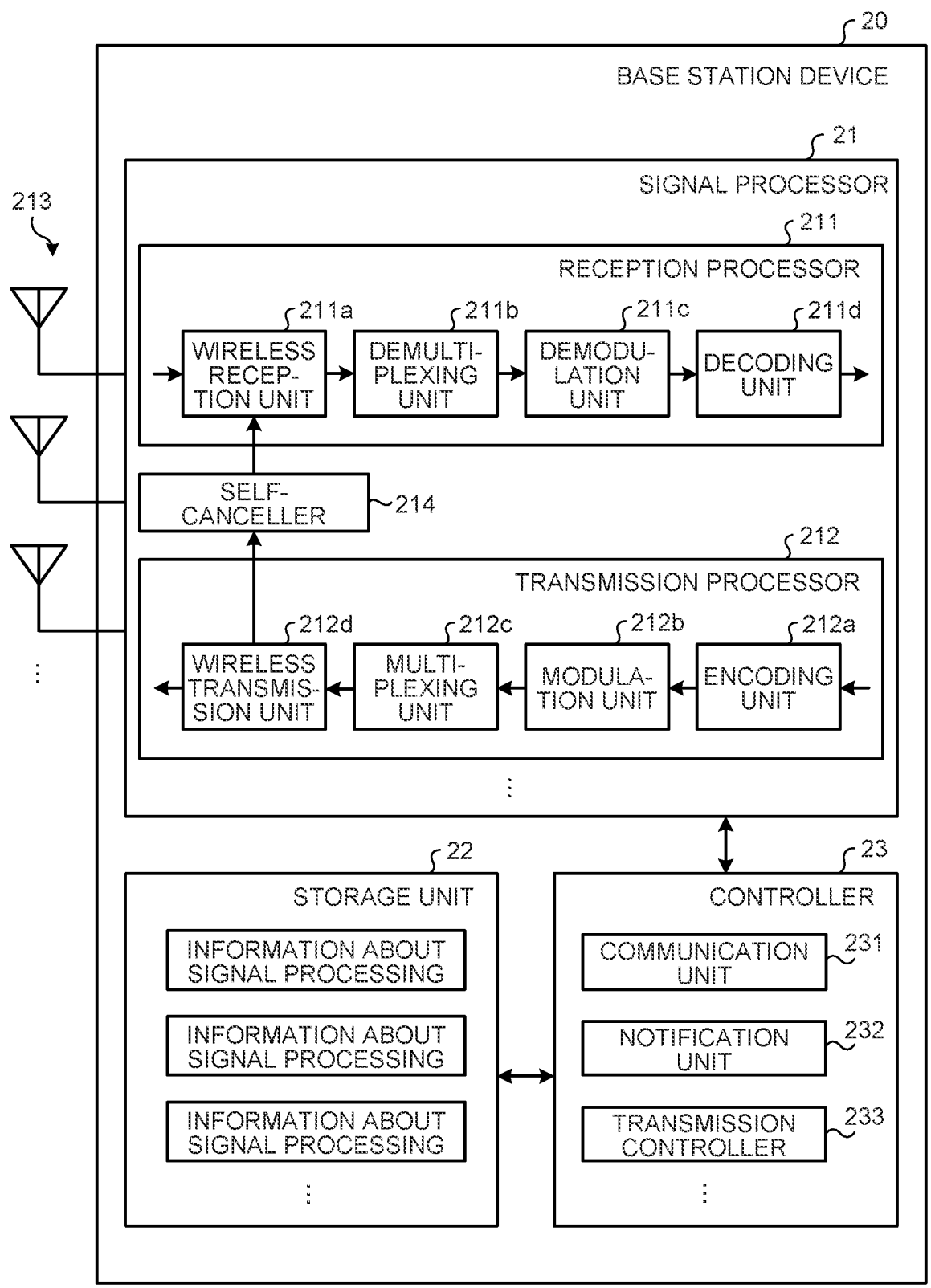
FIG. 7 is a diagram illustrating a configuration example of a base station device according to the embodiment of the present disclosure.

Next, a configuration of the base station device will be described. FIG. 7 is a diagram illustrating a configuration example of the base station device 20 according to the embodiment of the present disclosure. The base station device 20 supports a 2-step random access procedure in addition to the conventional 4-step random access procedure (contention-based random access procedure) and the conventional 3-step random access procedure (non-contention-based random access procedure). The base station device 20 can perform NOMA communication with the terminal device 40. The base station device 20 includes a signal processor 21, a storage unit 22, and a controller 23. The configuration illustrated in FIG. 7 is a functional configuration, and the hardware configuration may be different from this functional configuration. The functions of the base station device 20 may be implemented in a distributed manner in a plurality of physically separated components.

The signal processor 21 is a signal processor for wirelessly communicating with other wireless communication devices (for example, the terminal device 40 and the relay device 30). The signal processor 21 operates under the control of the controller 23. The signal processor 21 supports one or more wireless access methods. For example, the signal processor 21 supports both NR and LTE. The signal processor 21 may support W-CDMA and cdma2000 in addition to NR and LTE. The signal processor 21 supports communication using NOMA.

The signal processor 21 includes a reception processor 211, a transmission processor 212, an antenna 213, and a self-canceller 214. The signal processor 21 may include a plurality of reception processors 211, a plurality of transmission processors 212, a plurality of antennas 213, and a plurality of self-cancellers 214. When the signal processor 21 supports a plurality of wireless access methods, each component of the signal processor 21 can be configured individually for each of the wireless access methods. For example, the reception processor 211 and the transmission processor 212 may be individually configured for LTE and NR.

The reception processor 211 processes an uplink signal received via the antenna 213. The reception processor 211 includes a wireless reception unit 211a, a demultiplexing unit 211b, a demodulation unit 211c, and a decoding unit 211d.

The wireless reception unit 211a subjects an uplink signal to down-conversion, removal of an unnecessary frequency component, control of an amplification level, quadrature demodulation, conversion to a digital signal, removal of a guard interval (cyclic prefix), extraction of a frequency domain signal by fast Fourier transform, and the like. The demultiplexing unit 211b demultiplexes an uplink channel such as a physical uplink shared channel (PUSCH) or a physical uplink control channel (PUCCH) and an uplink reference signal from the signal output from the wireless reception unit 211a. The demodulation unit 211c demodulates the received signal using a modulation method such as binary phase shift keying (BPSK) or quadrature phase shift keying (QPSK) with respect to the modulation symbol of the uplink channel. The modulation method used by the demodulation unit 211c may be 16 quadrature amplitude modulation (QAM), 64 QAM, or 256 QAM. In this case, the signal points on a constellation do not necessarily have to be equidistant. The constellation may be a non-uniform constellation (NUC). The decoding unit 211d performs a decoding process on the encoded bits of the demodulated uplink channel. The decoded uplink data and uplink control information are output to the controller 23.

The transmission processor 212 performs a process of transmitting downlink control information and downlink data. The transmission processor 212 includes an encoding unit 212a, a modulation unit 212b, a multiplexing unit 212c, and a wireless transmission unit 212d.

The encoding unit 212a encodes the downlink control information and the downlink data input from the controller 23 using an encoding method such as block encoding, convolutional encoding, turbo encoding, or the like. The modulation unit 212b modulates the encoded bits output from the encoding unit 212a by a predetermined modulation method such as BPSK, QPSK, 16 QAM, 64 QAM, or 256 QAM. In this case, the signal points on a constellation do not necessarily have to be equidistant. The constellation may be a non-uniform constellation. The multiplexing unit 212c multiplexes the modulation symbol of each channel and the downlink reference signal and arranges the multiplexed symbols in a predetermined resource element. The wireless transmission unit 212d performs various types of signal processing on a signal from the multiplexing unit 212c. For example, the wireless transmission unit 212d performs conversion into a time domain by fast Fourier transform, addition of a guard interval (cyclic prefix), generation of a baseband digital signal, conversion into an analog signal, quadrature modulation, up-conversion, removal of an extra frequency component, amplification of power, and the like. The signal generated by the transmission processor 212 is transmitted from the antenna 213.

The self-canceller 214 cancels self-interference in which a signal transmitted from the wireless transmission unit 212d leaks into the wireless reception unit 211a.

The storage unit 22 is a storage device capable of reading and writing data, such as a DRAM, SRAM, flash memory, or hard disk. The storage unit 22 functions as a storage means of the base station device 20.

The controller 23 is a controller that controls each unit of the base station device 20. The controller 23 is realized by, for example, a processor such as a central processing unit (CPU) or a micro processing unit (MPU). For example, the controller 23 is realized by the processor executing various programs stored in the internal storage device of the base station device 20 using a random access memory (RAM) or the like as a work area. The controller 23 may be realized by an integrated circuit such as an application specific integrated circuit (ASIC) or a field programmable gate array (FPGA). Any of the CPU, the MPU, the ASIC, and the FPGA can be regarded as a controller.

As illustrated in FIG. 7, the controller 23 includes a communication unit 231, a notification unit 232, and a transmission controller 233. The respective blocks (the communication unit 231 to the notification unit 235) constituting the controller 23 are functional blocks indicating the functions of the controller 23. These functional blocks may be software blocks or hardware blocks. For example, each of the functional blocks described above may be one software module realized by software (including a microprogram), or may be one circuit block on a semiconductor chip (die). Of course, each of the functional blocks may be one processor or one integrated circuit. The functional blocks are configured by arbitrary methods.

The controller 23 may be configured in units of functions different from the above-described functional blocks. The operations of the blocks (the communication unit 231 to the transmission controller 233) constituting the controller 23 will be described later. The operations of the blocks constituting the controller 23 may be similar to the operations of the blocks constituting the controller 45 of the terminal device 40. The configuration of the terminal device 40 will be described later.

<2-4. Configuration of Relay Device>

Figure 8:
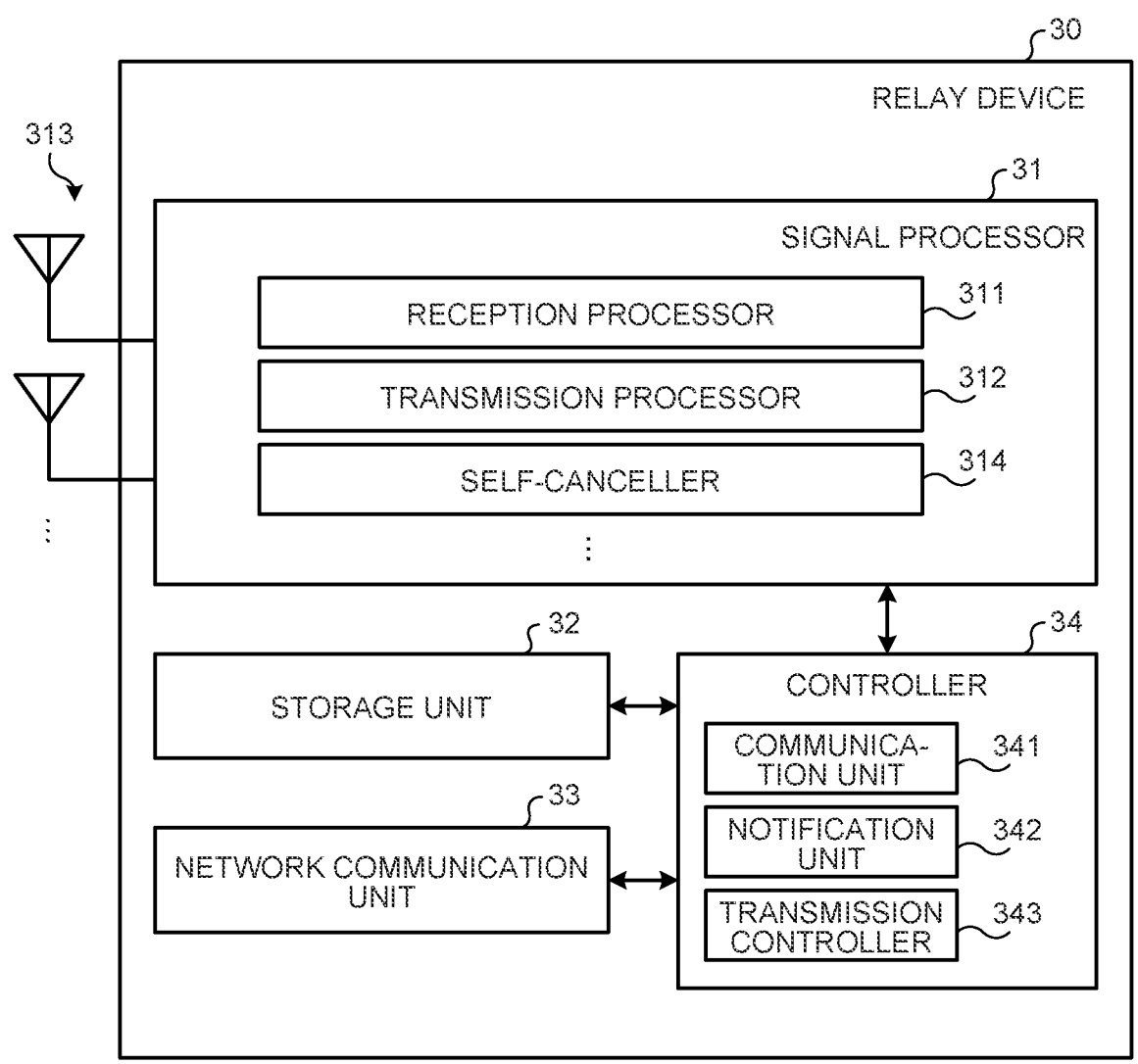
FIG. 8 is a diagram illustrating a configuration example of a relay device according to the embodiment of the present disclosure.

Next, a configuration of the relay device 30 will be described. FIG. 8 is a diagram illustrating a configuration example of the relay device 30 according to the embodiment of the present disclosure. The relay device 30 can perform NOMA communication with the terminal device 40. The relay device 30 includes a signal processor 31, a storage unit 32, a network communication unit 33, and a controller 34. The configuration illustrated in FIG. 8 is a functional configuration, and the hardware configuration may be different from this functional configuration. The functions of the relay device 30 may be implemented in a distributed manner in a plurality of physically separated components.

The signal processor 31 is a signal processor for wirelessly communicating with other wireless communication devices (for example, the base station device 20 and the terminal device 40). The signal processor 31 operates under the control of the controller 34. The signal processor 31 includes a reception processor 311, a transmission processor 312, an antenna 313, and a self-canceller 314. The configurations of the signal processor 31, the reception processor 311, the transmission processor 312, and the antenna 313 are similar to those of the signal processor 21, the reception processor 211, the transmission processor 212, the antenna 213, and the self-canceller unit 214 of the base station device 20.

The storage unit 32 is a storage device capable of reading and writing data, such as a DRAM, SRAM, flash memory, or hard disk. The storage unit 32 functions as a storage means of the relay device 30. The configuration of the storage unit 32 is similar to that of the storage unit 22 of the base station device 20.

The network communication unit 33 is a communication interface for communicating with other devices. For example, the network communication unit 33 is a LAN interface such as an NIC. The network communication unit 33 may be a wired interface or a wireless interface. The network communication unit 33 functions as a network communication means of the relay device 30. The network communication unit 33 communicates with the base station device 20 under the control of the controller 34.

The controller 34 is a controller that controls each unit of the relay device 30. The configuration of the controller 34 may be similar to that of the controller 23 of the base station device 20. The controller 34 includes a communication unit 341, a notification unit 342, and a transmission controller 343. The controller 34 may be configured in units of functions different from the above-described functional blocks. The operations of the blocks (the communication unit 341 to the transmission controller 343) constituting the controller 34 will be described later.

<2-5. Configuration of Terminal Device>

Figure 9:
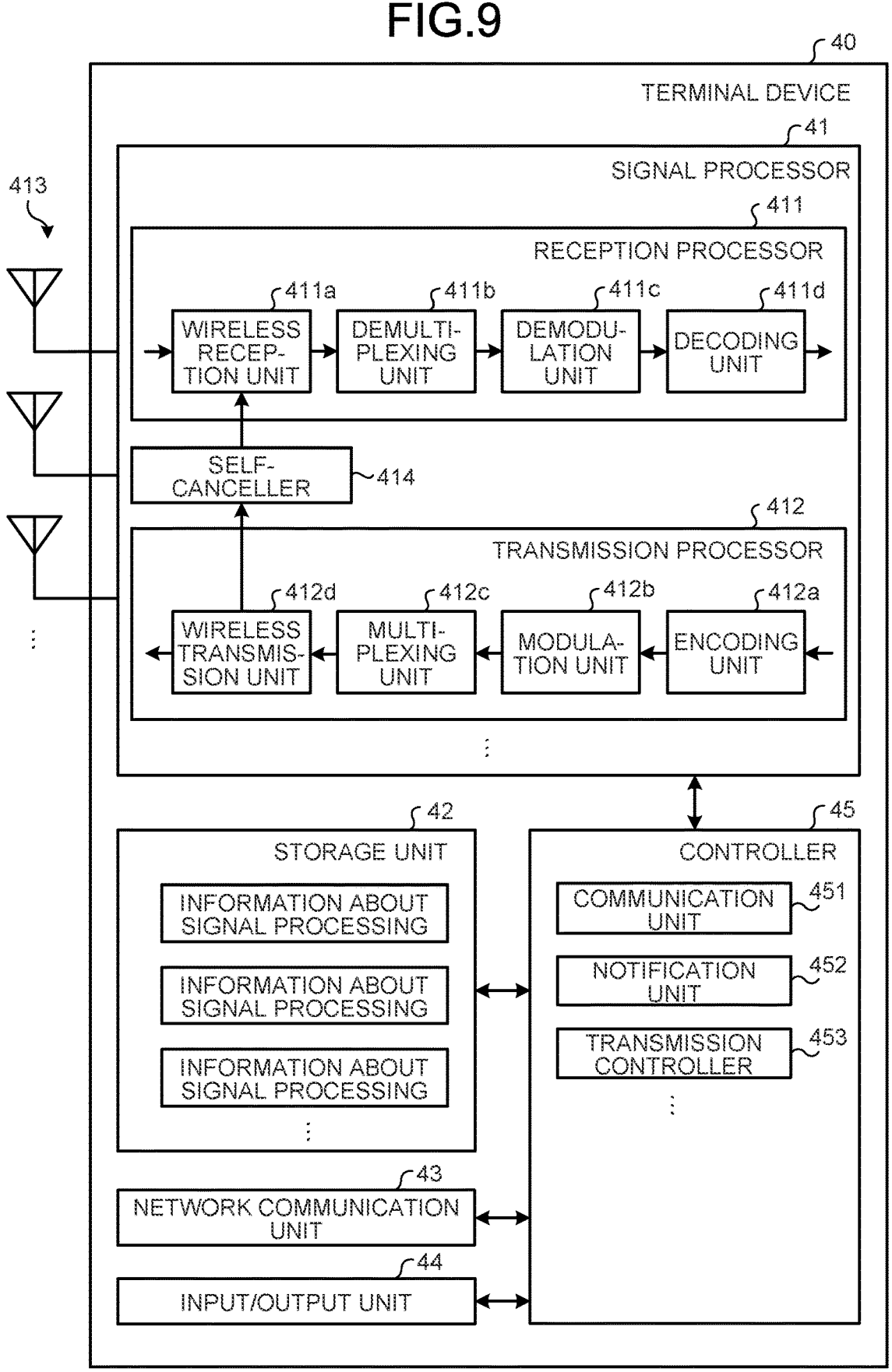
FIG. 9 is a diagram illustrating a configuration example of a terminal device according to the embodiment of the present disclosure.

Next, a configuration of the terminal device 40 will be described. FIG. 9 is a diagram illustrating a configuration example of the terminal device 40 according to the embodiment of the present disclosure. The terminal device 40 can use a 2-step random access procedure in addition to the conventional 4-step random access procedure (contention-based random access procedure) and the conventional 3-step random access procedure (non-contention-based random access procedure). The terminal device 40 is able to perform NOMA communication with the base station device 20 and the relay device 30. The terminal device 40 includes a signal processor 41, a storage unit 42, a network communication unit 43, an input/output unit 44, and a controller 45. The configuration illustrated in FIG. 9 is a functional configuration, and the hardware configuration may be different from this functional configuration. The functions of the terminal device 40 may be implemented in a distributed manner in a plurality of physically separated components.

The signal processor 41 is a signal processor for wirelessly communicating with other wireless communication devices (for example, the base station device 20 and the relay device 30). The signal processor 41 operates under the control of the controller 45. The signal processor 41 supports one or more wireless access methods. For example, the signal processor 41 supports both NR and LTE. The signal processor 41 may support W-CDMA and cdma2000 in addition to NR and LTE. The signal processor 41 supports communication using NOMA.

The signal processor 41 includes a reception processor 411, a transmission processor 412, an antenna 413, and a self-canceller 414. The signal processor 41 may include a plurality of reception processors 411, a plurality of transmission processors 412, a plurality of antennas 413, and a plurality of self-cancellers 414. When the signal processor 41 supports a plurality of wireless access methods, each component of the signal processor 41 can be configured individually for each of the wireless access methods. For example, the reception processor 411 and the transmission processor 412 may be individually configured for LTE and NR.

The reception processor 411 processes a downlink signal received via the antenna 413. The reception processor 411 includes a wireless reception unit 411a, a demultiplexing unit 411b, a demodulation unit 411c, and a decoding unit 411d.

The wireless reception unit 411a subjects a downlink signal to down-conversion, removal of an unnecessary frequency component, control of an amplification level, quadrature demodulation, conversion to a digital signal, removal of a guard interval (cyclic prefix), extraction of a frequency domain signal by fast Fourier transform, and the like. The demultiplexing unit 411b demultiplexes a downlink channel, a downlink synchronization signal, and a downlink reference signal from the signal output from the wireless reception unit 411a. The downlink channel is, for example, a channel such as a physical broadcast channel (PBCH), physical downlink shared channel (PDSCH), or physical downlink control channel (PDCCH). The demodulation unit 211c demodulates the received signal using a modulation method such as BPSK, QPSK, 16QAM, 64QAM, or 256QAM for the modulation symbol of the downlink channel. In this case, the signal points on a constellation do not necessarily have to be equidistant. The constellation may be a non-uniform constellation. The decoding unit 411d performs a decoding process on the demodulated encoded bits of the downlink channel. The decoded downlink data and downlink control information are output to the controller 45.

The transmission processor 412 performs a process of transmitting uplink control information and uplink data. The transmission processor 412 includes an encoding unit 412a, a modulation unit 412b, a multiplexing unit 412c, and a wireless transmission unit 412d.

The encoding unit 412a encodes the uplink control information and the uplink data input from the controller 45 using an encoding method such as block encoding, convolutional encoding, turbo encoding, or the like. The modulation unit 412b modulates the encoded bits output from the encoding unit 412a by a predetermined modulation method such as BPSK, QPSK, 16 QAM, 64 QAM, or 256 QAM. In this case, the signal points on a constellation do not necessarily have to be equidistant. The constellation may be a non-uniform constellation. The multiplexing unit 412c multiplexes the modulation symbol of each channel and the uplink reference signal and arranges the multiplexed symbols in a predetermined resource element. The wireless transmission unit 412d performs various types of signal processing on a signal from the multiplexing unit 412c. For example, the wireless transmission unit 412d performs conversion into a time domain by inverse fast Fourier transform, addition of a guard interval (cyclic prefix), generation of a baseband digital signal, conversion into an analog signal, quadrature modulation, up-conversion, removal of an extra frequency component, amplification of power, and the like. The signal generated by the transmission processor 412 is transmitted from the antenna 413.

The self-canceller 414 cancels self-interference in which a signal transmitted from the wireless transmission unit 412d leaks into the wireless reception unit 411a. The storage unit 42 is a storage device capable of reading and writing data, such as a DRAM, SRAM, flash memory, or hard disk. The storage unit 42 functions as a storage means of the terminal device 40.

The network communication unit 43 is a communication interface for communicating with other devices. For example, the network communication unit 43 is a LAN interface such as an NIC. The network communication unit 43 may be a wired interface or a wireless interface. The network communication unit 43 functions as a network communication means of the terminal device 40. The network communication unit 43 communicates with other devices under the control of the controller 45.

The input/output unit 44 is a user interface for exchanging information with the user. For example, the input/output unit 44 is an operation device for the user to perform various operations, such as a keyboard, a mouse, an operation key, or a touch panel. Alternatively, the input/output unit 44 is a display device such as a liquid crystal display or an organic electroluminescence (EL) display. The input/output unit 44 may be an acoustic device such as a speaker or a buzzer. The input/output unit 44 may be a lighting device such as a light emitting diode (LED) lamp. The input/output unit 44 functions as an input/output means (input means, output means, operation means, or notification means) of the terminal device 40.

The controller 45 is a controller that controls each unit of the terminal device 40. The controller 45 is realized by, for example, a processor such as a CPU or an MPU. For example, the controller 45 is realized by the processor executing various programs stored in the internal storage device of the terminal device 40 using a RAM or the like as a work area. The controller 45 may be realized by an integrated circuit such as an ASIC or an FPGA. Any of the CPU, the MPU, the ASIC, and the FPGA can be regarded as a controller.

As illustrated in FIG. 9, the controller 45 includes a communication unit 451, a notification unit 452, and a transmission controller 453. The respective blocks (the communication unit 451 to the transmission controller 453) constituting the controller 45 are functional blocks indicating the functions of the controller 45. These functional blocks may be software blocks or hardware blocks. For example, each of the functional blocks described above may be one software module realized by software (including a microprogram), or may be one circuit block on a semiconductor chip (die). Of course, each of the functional blocks may be one processor or one integrated circuit. The functional blocks are configured by arbitrary methods.

The controller 45 may be configured in units of functions different from the above-described functional blocks. The operations of the blocks (the communication unit 451 to the transmission controller 453) constituting the controller 45 will be described later. The operations of the blocks constituting the controller 45 may be similar to the operations of the blocks (the communication unit 231 to the transmission controller 233) constituting the controller 23 of the base station device 20.

The base station device 20 that will appear in the following description is typically assumed to be a base station such as an eNB or a gNB, but of course, the base station device 20 is not limited to the eNB or the gNB. For example, the base station device 20 may be a relay terminal or a terminal such as a leader terminal in a terminal group. The base station device 20 may be the device (or system) exemplified in <2-1. Overall Configuration of Communication System> or the like. The description of the base station device 20 appearing below can be replaced with "relay device 30" or "terminal device 40".

In the following description, some specific values may be shown to describe specific examples, but the values do not depend on the examples, and other values may be used instead.

The concept of "resource" includes frequency, time, resource element, resource block, bandwidth part, component carrier, symbol, sub-symbol, slot, mini-slot, subframe, frame, PRACH occasion, occasion, code, multi-access physical resource, multi-access signature, and the like. Of course, the resource is not limited to them.

<2-6. Configuration of Assumed System 1A>

Figure 10:
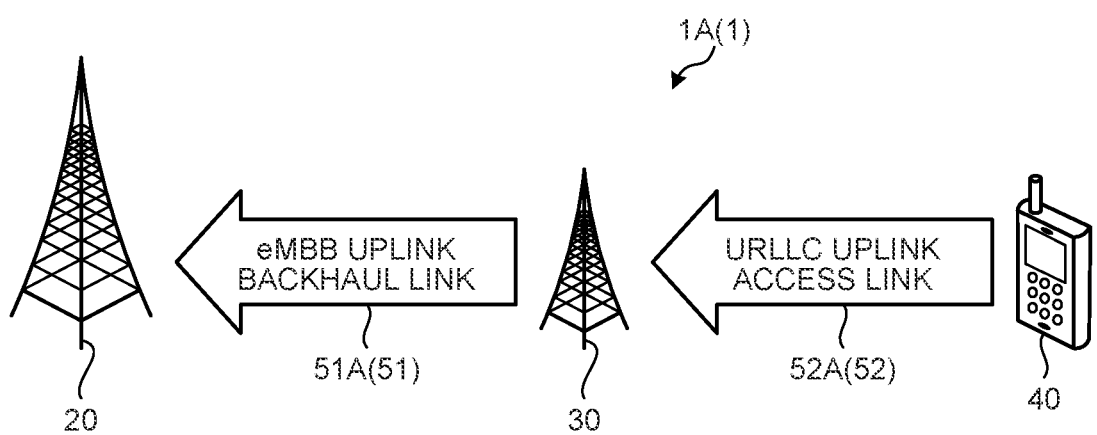
FIG. 10 is a diagram illustrating a configuration example of an assumed system 1A according to the embodiment of the present disclosure.

FIG. 10 is a diagram illustrating a configuration example of an assumed system 1A according to the embodiment of the present disclosure. As the assumed system of the communication system 1, for example, a wireless system that wirelessly communicates different qualities of service (QoS) between eMBB and URLLC is assumed.

In addition to QoS, eMBB and URLLC have different lengths of allocated resources. Specifically, the length of the channel allocated to URLLC (such as PDSCH/PUSCH/PUCCH) tends to be smaller than the length of the channel allocated to eMBB.

eMBB and URLLC are also different in a channel quality indicator (CQI) table. The CQI table applied in eMBB includes many high-efficiency modulation and coding rates, and the CQI table applied in URLLC includes many low-efficiency modulation and coding rates. Specifically, the CQI table applied in eMBB includes 256 QAM, and the CQI table applied in URLLC does not include 256 QAM. In a case of the same index, the CQI table applied in eMBB is higher in efficiency than the CQI table applied in URLLC.

eMBB and URLLC are also different in a modulation and coding scheme (MCS) table. The MCS table applied in eMBB includes many high-efficiency modulation and coding rates, and the MCS table applied in URLLC includes many low-efficiency modulation and coding rates. Specifically, in a case of the same index, the MCS table applied in eMBB is higher in efficiency than the MCS table applied in URLLC.

eMBB and URLLC are also different in the presence or absence of repetitive transmission setting. The repetitive transmission setting is not applied to eMBB, and the repetitive transmission setting is applied to URLLC.

eMBB and URLLC are different in PDSCH/PUSCH mapping type. Specifically, slot-based scheduling (PDSCH/PUSCH mapping type A) tends to be applied to eMBB, and non-slot-based scheduling (PDSCH/PUSCH mapping type B) tends to be performed to URLLC. The slot-based scheduling is a method in which a resource is allocated from the head of a slot on the time axis, and the non-slot-based scheduling is a method in which a resource can be allocated from the middle of a slot on the time axis.

The assumed system has a backhaul link 51 between the base station device 20 and the relay device 30 and an access link 52 between the relay device 30 and the terminal device 40. In the assumed system, in-band full-duplex communication is adopted in which eMBB and URLLC are transmitted and received using resources of the same frequency band and the same timing in different wireless links in the backhaul link 51 and the access link 52. That is, while wirelessly communicating eMBB, the assumed system wirelessly communicates URLLC by using a resource at least partially overlapping the resource of the eMBB on the frequency axis and the time axis. The backhaul link 51 includes an uplink backhaul link 51A from the relay device 30 to the base station device 20 and a downlink backhaul link 51B from the base station device 20 to the relay device 30. The access link 52 includes an uplink access link 52A from the terminal device 40 to the relay device 30 and a downlink access link 52B from the relay device 30 to the terminal device 40. Examples of the assumed system include assumed systems 1A to 1F.

The relay device 30 in the assumed system 1A receives URLLC from the terminal device 40 in the uplink access link 52A. The relay device 30 transmits eMBB to the base station device 20 in the uplink backhaul link 51A. The relay device 30 receives the URLLC of the uplink access link 52A by using a resource partially overlapping the eMBB resource of the uplink backhaul link 51A. That is, the relay device 30 in the assumed system 1A adopts in-band full-duplex communication in which eMBB is transmitted to the base station device 20 using the uplink backhaul link 51A and URLLC is received from the terminal device 40 using the uplink access link 52A.

<2-7. Configuration of Assumed System 1B>

Figure 11:
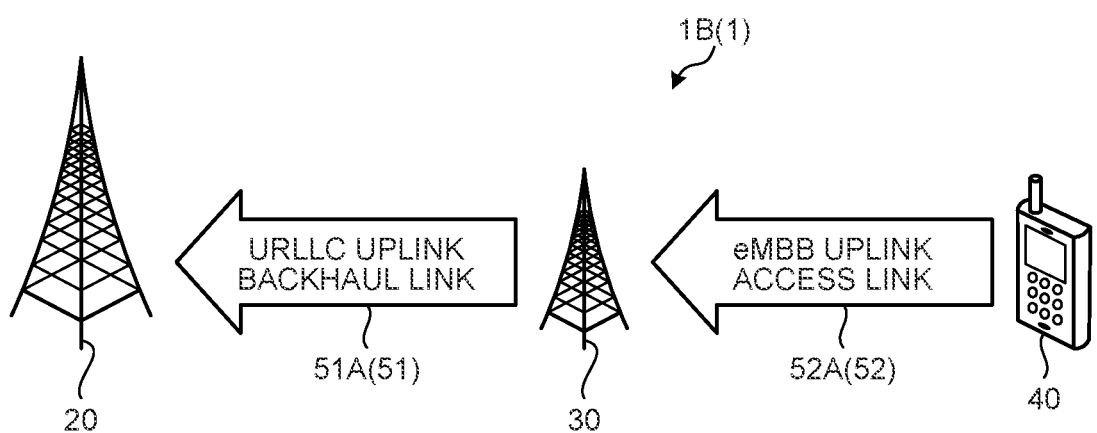
FIG. 11 is a diagram illustrating an example of a sequence of communication operations of eMBB and URLLC using in-band full-duplex communication in the assumed system 1A.

FIG. 11 is a diagram illustrating a configuration example of an assumed system 1B according to the embodiment of the present disclosure. The relay device 30 in the assumed system 1B receives eMBB from the terminal device 40 in the uplink access link 52A. The relay device 30 transmits the URLLC to the base station device 20 in the uplink backhaul link 51A using a resource partially overlapping the resource of the eMBB of the uplink access link 52A. That is, the relay device 30 in the assumed system 1B adopts in-band full-duplex communication in which eMBB is received from the terminal device 40 using the uplink access link 52A and URLLC is transmitted to the base station device 20 using the uplink backhaul link 51A.

<2-8. Configuration of Assumed System 1C>

Figure 12:
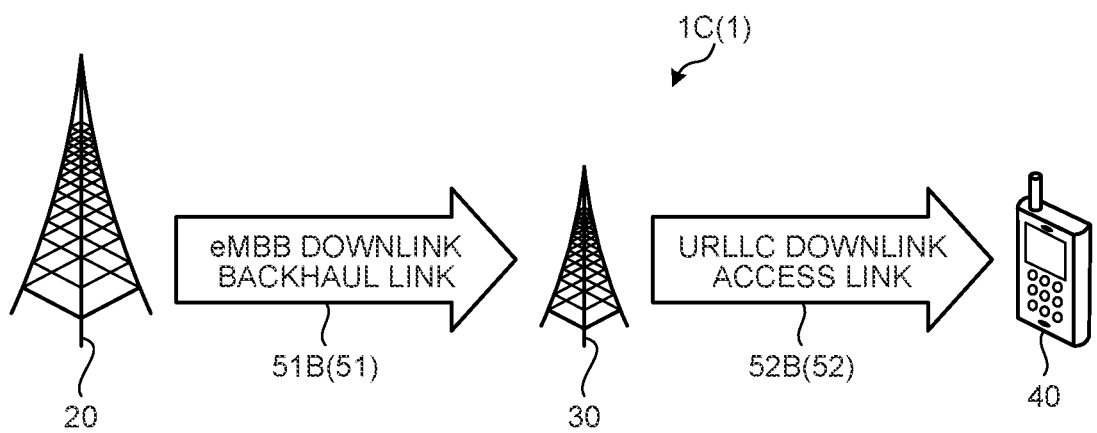
FIG. 12 is a diagram illustrating a configuration example of an assumed system 1B according to the embodiment of the present disclosure.

FIG. 12 is a diagram illustrating a configuration example of an assumed system 1C according to the embodiment of the present disclosure. The relay device 30 in the assumed system 1C receives eMBB from the base station device 20 in the downlink backhaul link 51B. The relay device 30 transmits URLLC to the terminal device 40 in the downlink access link 52B using a resource partially overlapping the resource of the eMBB of the downlink backhaul link 51B. That is, the relay device 30 in the assumed system 1C adopts in-band full-duplex communication in which eMBB is received from the base station device 20 using the downlink backhaul link 51B and URLLC is transmitted to the terminal device 40 using the downlink access link 52B.

<2-9. Configuration of Assumed System 1D>

Figure 13:
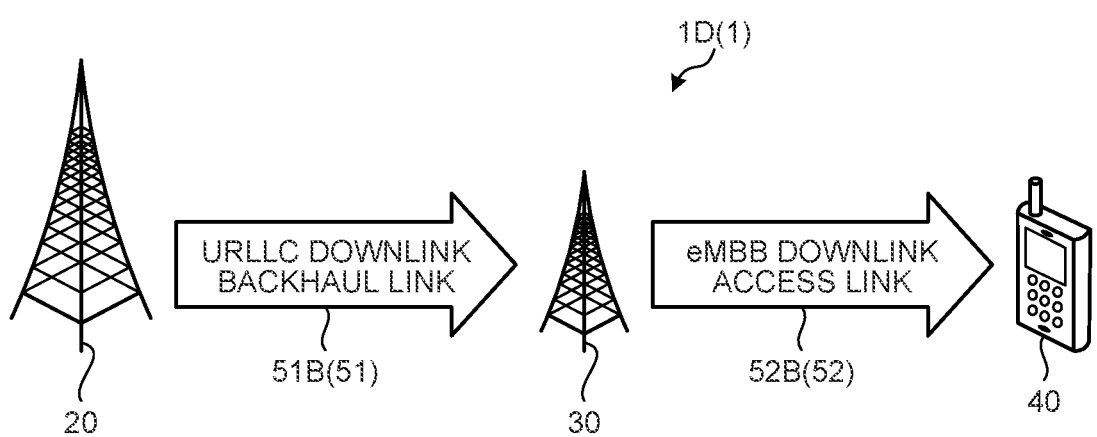
FIG. 13 is a diagram illustrating a configuration example of an assumed system 1C according to the embodiment of the present disclosure.

FIG. 13 is a diagram illustrating a configuration example of an assumed system 1D according to the embodiment of the present disclosure. The relay device 30 in the assumed system 1D transmits eMBB to the terminal device 40 in the downlink access link 52B. The relay device 30 receives URLLC in the downlink backhaul link 51B from the base station device 20 using a resource partially overlapping the resource of the eMBB of the downlink access link 52B. That is, the relay device 30 in the assumed system 1D adopts in-band full-duplex communication in which URLLC is received from the base station device 20 in the downlink backhaul link 51B and eMBB is transmitted to the terminal device 40 using the downlink access link 52B.

<2-10. Configuration of Assumed System 1E>

Figure 14:
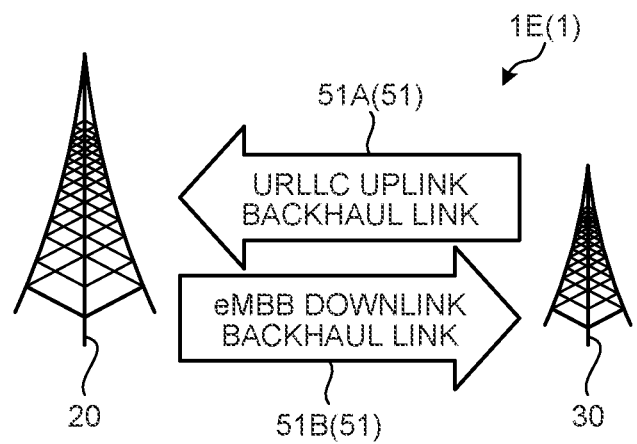
FIG. 14 is a diagram illustrating a configuration example of an assumed system 1D according to the embodiment of the present disclosure.

FIG. 14 is a diagram illustrating a configuration example of an assumed system 1E according to the embodiment of the present disclosure. The relay device 30 in the assumed system 1E receives eMBB from the base station device 20 in the downlink backhaul link 51B and transmits URLLC to the base station device 20 in the uplink backhaul link 51A. The relay device 30 adopts in-band full-duplex communication in which eMBB is received from the base station device 20 using the downlink backhaul link 51B and URLLC is transmitted to the base station device 20 in the uplink backhaul link 51A using a resource partially overlapping the resource of the eMBB of the downlink backhaul link 51B.

<2-11. Configuration of Assumed System 1F>

Figure 15:
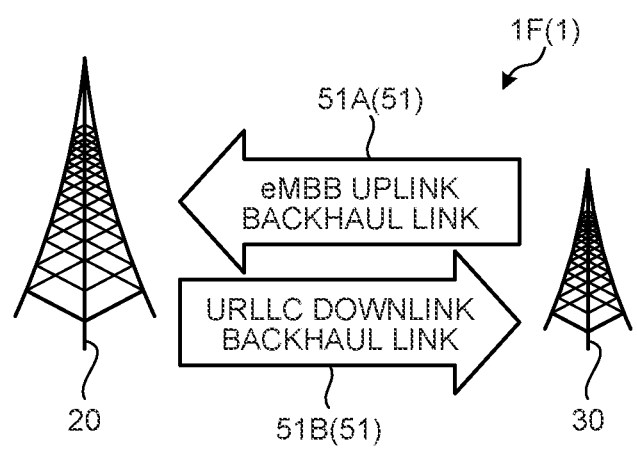
FIG. 15 is a diagram illustrating a configuration example of an assumed system 1E according to the embodiment of the present disclosure.

FIG. 15 is a diagram illustrating a configuration example of an assumed system 1F according to the embodiment of the present disclosure. The relay device 30 in the assumed system 1F transmits eMBB to the base station device 20 in the uplink backhaul link 51A, and receives URLLC from the base station device 20 in the downlink backhaul link 51B. The relay device 30 adopts in-band full-duplex communication in which eMBB is transmitted to the base station device 20 using the uplink backhaul link 51A, and URLLC is received from the base station device 20 in the downlink backhaul link 51B using a resource partially overlapping the resource of the eMBB of the uplink backhaul link 51A.

3. BASIC COMMUNICATION CONTROL

The relay device 30 requests resources (resource pool) capable of in-band full-duplex communication from the base station device 20 as a parent node. The resources capable of in-band full-duplex communication requested by the relay device 30 to the base station device 20 include a resource in which both the downlink (DL) and the uplink (UL) are set, a flexible link, and a resource in which a full duplex link (full-duplex communication) is set. In the downlink, there are a resource capable of transmitting an uplink channel/signal in the terminal device 40, for example, and a resource likely to receive an uplink channel/signal in the base station device 20, for example. In the uplink, there are a resource expected to receive a downlink channel/signal in the terminal device 40, for example, and a resource likely to transmit a downlink channel/signal in the base station device 20, for example. In the flexible link, for example, there is a resource that performs none of transmission of an uplink channel/signal and reception of a downlink channel/signal unless another resource state is indicated in the terminal device 40. If another resource state is indicated, the terminal device 40 performs the operation of the indicated resource state. The full-duplex communication link includes, a resource that can transmit an uplink channel/signal and is expected to receive a downlink channel/signal in the terminal device 40, for example, and a resource that is likely to receive an uplink channel/signal and is likely to transmit a downlink channel/signal in the base station device 20, for example.

The relay device 30 acquires, from the base station device 20, for example, a resource capable of performing communication in the same frequency band and at the same timing in the resource used for eMBB, that is, a resource capable of in-band full-duplex communication. Examples of the resource capable of in-band full-duplex communication include a time domain of the resource and a frequency domain of the resource.

In the time domain, for example, there are a period+section in the time domain and a period+bitmap in the time domain. In the frequency domain, for example, there are a bandwidth part (BWP), a resource block group, a resource block unit, and the like. The bandwidth part is a bandwidth used for communication. The resource block is used to map a certain physical channel (PDSCH, PUSCH, etc.) to a resource element. One resource block is defined by a predetermined number of subcarriers continuous in the frequency domain and a predetermined number of symbols continuous in the time domain. The resource block group includes a plurality of resource blocks.

For example, the base station device 20 may change the resource setting or the communication setting depending on whether the resource destination of the eMBB with which the URLLC overlaps in in-band full-duplex communication is the uplink backhaul link 51A or the downlink backhaul link 51B, and can change the resource setting or the communication setting as appropriate.

The relay device 30 performs scheduling of the terminal device 40 (child node) and the access link 52 from the resource area capable of in-band full-duplex communication acquired from the base station device 20. The relay device 30 cannot execute scheduling of the terminal device 40 (child node) and the access link 52 using a resource that has not been set as a resource capable of in-band full-duplex communication. The relay device 30 also sets a resource to be used for in-band full-duplex communication from the resource capable of in-band full-duplex communication acquired from the base station device 20. For example, the relay device 30 sets a resource to be used for URLLC from the resource acquired from the base station device 20 that can be used for in-band full-duplex communication.

The communication unit 341 in the relay device 30 performs wireless communication of the URLLC using the second resource at least partially overlapping the first resource on the frequency axis and the time axis while performing wireless communication of the eMBB using the first resource of the predetermined frequency channel. The notification unit 342 in the relay device 30 notifies the eMBB reception destination of the second resource. The transmission controller 343 in the relay device 30 controls the transmission power of the eMBB of the first resource overlapping the second resource or the transmission power of the URLLC of the second resource when performing the URLLC wireless communication while performing the eMBB wireless communication.

Figure 16:
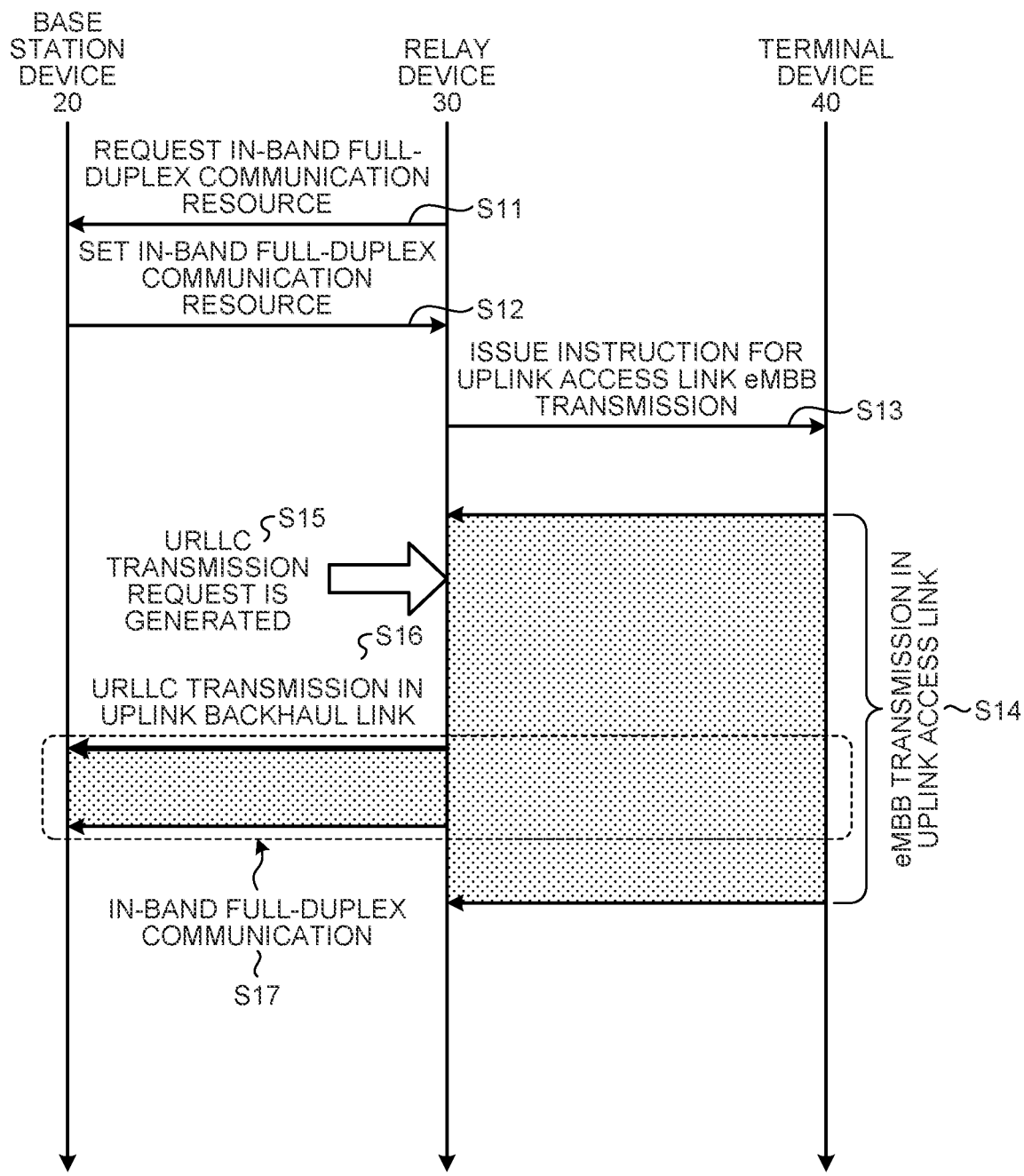
FIG. 16 is a diagram illustrating a configuration example of an assumed system 1F according to the embodiment of the present disclosure.

FIG. 16 is a diagram illustrating an example of a sequence of communication operations of eMBB and URLLC using in-band full-duplex communication in the assumed system 1A. The relay device 30 illustrated in FIG. 16 notifies the base station device 20 of a resource request of in-band full-duplex communication (step S11). When detecting the resource request of in-band full-duplex communication, the base station device 20 sets the resource of in-band full-duplex communication in the relay device 30 (step S12).

The relay device 30 instructs the terminal device 40 to perform the eMBB transmission of the uplink access link 52A by using the set resource of in-band full-duplex communication (step S13). The terminal device 40 transmits the eMBB in the uplink access link 52A to the relay device 30 in response to the eMBB transmission instruction from the relay device 30 (step S14).

In addition, when a URLLC transmission request occurs during reception of the eMBB in the uplink access link 52A from the terminal device 40 (step S15), the relay device 30 transmits the URLLC of the uplink backhaul link 51A to the base station device 20 using a resource partially overlapping the eMBB transmission resource (step S16). As a result, the relay device 30 receives the eMBB from the terminal device 40 using the uplink access link 52A, and transmits the URLLC to the base station device 20 in the uplink backhaul link 51A using the resource partially overlapping the eMBB transmission resource, thereby implementing the in-band full-duplex communication (step S17).

4. eMBB COMMUNICATION CONTROL

<4-1. eMBB Communication Control in Assumed System 1A>

The relay device 30 in the assumed system 1A transmits eMBB to the base station device 20 using the uplink backhaul link 51A, and receives URLLC from the terminal device 40 using the uplink access link 52A. The relay device 30 sets a part of the eMBB resource of the uplink backhaul link 51A as a resource to be used for URLLC reception. The communication unit 341 in the relay device 30 receives the URLLC from the terminal device 40 in the uplink access link 52A using the resource partially overlapping the eMBB resource in the uplink backhaul link 51A.

At this time, the transmission controller 343 in the relay device 30 executes eMBB communication control for reducing the amount of transmission power of the eMBB resource overlapping the URLLC, among the eMBB resources of the uplink backhaul link 51A. In the eMBB communication control, not only the transmission power amount of the eMBB resource overlapping the URLLC is reduced, but also the transmission of the eMBB resource overlapping the URLLC may be stopped. Appropriate change can be made. As a result, the relay device 30 reduces interference with URLLC generated in the eMBB transmission, thereby improving the reliability of reception of URLLC requiring low delay while suppressing the influence of self-interference of in-band full-duplex communication on communication quality degradation. Then, even if eMBB and URLLC are communicated by in-band full-duplex communication, it is possible to shorten the delay time caused by the wait for transmission of URLLC as in the related art.

<4-2. Notification Method of eMBB Resource in Assumed System 1A>

The relay device 30 in the assumed system 1A illustrated in FIG. 10 uses, for example, pre-action, in-progress action, and post-action as methods for notifying the base station device 20 that is a reception destination of eMBB, of the eMBB resource overlapping URLLC.

<Pre-Action>

The pre-action is a method for notifying the base station device 20 of an eMBB resource candidate possibly overlapping URLLC from the relay device 30 before execution of in-band full-duplex communication. The notification unit 342 in the relay device 30 notifies the base station device 20 that is a reception destination of the eMBB, of the eMBB resource candidate possibly scheduled as URLLC. As a method by which the relay device 30 notifies the base station device 20 of the eMBB resource candidate, radio resource control (RRC) signaling may be used, for example.

If the resource candidate possibly scheduled as URLLC is used for eMBB transmission, the transmission controller 343 in the relay device 30 executes eMBB communication control to reduce at least the transmission power amount of eMBB of the resource. As a result, since the base station device 20 can recognize the resource candidate of the eMBB in advance by the pre-action of the relay device 30, it is possible to avoid a situation in which the eMBB overlapping URLLC cannot be received.

<In-Progress Action>

The in-progress action is a method by which the relay device 30 notifies the base station device 20 of the eMBB resource overlapping URLLC during execution of in-band full-duplex communication by the PUSCH of the uplink backhaul link 51A of the eMBB. The base station device 20 monitors the PUSCH of the uplink backhaul link 51A of the eMBB overlapping URLLC. Then, on the basis of the monitoring result of the PUSCH, the base station device 20 can recognize that the transmission power amount of the eMBB of the resource overlapping URLLC is decreased or the eMBB is not transmitted in the relay device 30.

The base station device 20 can recognize the eMBB resource overlapping URLLC, for example, by the reception power amount of a de-modulation reference signal (DMRS) in the PUSCH of the uplink backhaul link 51A of the eMBB or a DMRS sequence in the PUSCH of the uplink backhaul link 51A of the eMBB. The DMRS is a data demodulation reference signal used for estimation of a propagation path for demodulating a data signal, symbol timing synchronization, reception quality measurement, and the like. The base station device 20 can designate the eMBB resource overlapping URLLC and/or the transmission power of the eMBB, on the basis of the information associated with the DMRS sequence in the PUSCH. That is, since the base station device 20 can recognize the eMBB resource overlapping URLLC from the monitoring result of the PUSCH, it is possible to avoid a situation in which the eMBB overlapping URLLC cannot be received.

<Post-Action>

The post-action is a method (post indication) by which to notify the base station device 20, which is a reception destination of the eMBB, of the eMBB resource overlapping URLLC after execution of in-band full-duplex communication. The notification unit 342 in the relay device 30 notifies the base station device 20 of the eMBB resource having overlapped URLLC, using, for example, uplink control information (UCI) in the PUCCH in the uplink backhaul link 51A.

Specifically, the notification unit 342 in the relay device 30 notifies the base station device 20 of the time domain and the frequency domain of the eMBB resource having overlapped URLLC, using, for example, 2 bits in the UCI. The 2-bit state and the designated resource are preferably associated with each other by RRC signaling. The notification unit 342 preferably notifies the base station device 20 using a new PUCCH format, but the UCI may be multiplexed with another PUCCH. Appropriate change can be made. The UCI may be piggybacked on the resource of the uplink backhaul link 51A of the eMBB. In this case, the UCI is preferably placed on the channel of the uplink backhaul link 51A of the eMBB not overlapping URLLC. Appropriate change can be made. As a result, the base station device 20 can recognize the resource of the eMBB having overlapped URLLC.

<4-3. eMBB Communication Control in Assumed System 1B>

The relay device 30 in the assumed system 1B illustrated in FIG. 11 transmits URLLC to the base station device 20 using the uplink backhaul link 51A, and receives eMBB from the terminal device 40 using the uplink access link 52A.

The relay device 30 sets a part of the eMBB resource of the uplink access link 52A as a resource used for URLLC. The relay device 30 transmits the URLLC to the base station device 20 in the uplink backhaul link 51A using a resource partially overlapping the resource of the eMBB of the uplink access link 52A.

The relay device 30 notifies the terminal device 40 of the eMBB resource overlapping URLLC. The transmission controller 453 in the terminal device 40 executes eMBB communication control for reducing the amount of transmission power of the eMBB resource overlapping the URLLC, among the eMBB resources of the uplink access link 52A. In the eMBB communication control, not only the transmission power amount of the eMBB resource overlapping the URLLC is reduced, but also the transmission of the eMBB resource overlapping the URLLC may be stopped. Appropriate change can be made. As a result, interference with URLLC caused by the eMBB transmission can be reduced, thereby improving the reliability of reception of URLLC. Then, even if eMBB and URLLC are communicated by in-band full-duplex communication, it is possible to shorten the delay time caused by the wait for transmission of URLLC as in the related art.

The notification unit 452 in the terminal device 40 notifies the relay device 30, which is a reception destination of the eMBB, of the eMBB resource overlapping the URLLC. As a result, the relay device 30 can recognize the difference in reception power of the eMBB overlapping URLLC, thereby improving the decoding quality.

<4-4. Notification Method of eMBB Resource in Assumed System 1B>

The terminal device 40 in the assumed system 1B illustrated in FIG. 11 uses, for example, pre-action and post-action as methods for notifying the relay device 30 that is a reception destination of eMBB, of the eMBB resource having overlapped URLLC.

<Pre-Action>

In the pre-action, the notification unit 452 in the terminal device 40 notifies the relay device 30 that is a reception destination of the eMBB, of a resource candidate possibly scheduled as URLLC. As a method by which the terminal device 40 notifies the relay device 30 of the eMBB resource candidate, it is desirable to use RRC signaling. In the case of using the resource candidate possibly scheduled as URLLC in the eMBB, the transmission controller 453 in the terminal device 40 executes eMBB communication control to reduce at least the transmission power of eMBB of the resource. However, since the relay device 30 can recognize the resource candidate of the eMBB in advance by the pre-action of the terminal device 40, it is possible to avoid a situation in which the eMBB overlapping URLLC cannot be received.

<Post-Action>

In the post-action, the notification unit 452 in the terminal device 40 notifies the relay device 30, which is a reception destination of the eMBB, of the eMBB resource having overlapped the URLLC, in a request for retransmission of PUSCH in the uplink access link 52A of the eMBB. For example, an error is likely to occur in the eMBB that has overlapped the URLLC, and the notification unit 452 in the terminal device 40 notifies the relay device 30 of a request for retransmission of the uplink access link 52A of the eMBB. In the case of notifying the relay device 30 of a request for retransmission of all the PUSCHs (transport blocks), as in the case of normal retransmission, the terminal device 40 requests retransmission of each transport block designated by the HARQ process number and the new data indicator (NDI). The terminal device 40 may notify the relay device 30 of a request for retransmission of only the eMBB resource overlapping URLLC. In this case, for example, the terminal device 40 requests a retransmission by a code block group (CBG), that is, requests a retransmission of the CBG mapped to the eMBB resource having overlapped URLLC. In the retransmission request by the eMBB resource, the URLLC requests retransmission of only the eMBB uplink signal corresponding to the mapped resource. As a result, the relay device 30 can recognize the resource of the eMBB having overlapped URLLC.

<4-5. eMBB Communication Control in Assumed System 1C>

The relay device 30 in the assumed system 1C illustrated in FIG. 12 receives eMBB from the base station device 20 using the downlink backhaul link 51B and transmits URLLC to the terminal device 40 using the downlink access link 52B.

The relay device 30 sets a part of the eMBB resource of the downlink backhaul link 51B as a resource to be used for URLLC. The communication unit 341 of the relay device 30 transmits URLLC to the terminal device 40 in the downlink access link 52B using the resource partially overlapping the resource of the eMBB of the downlink backhaul link 51B.

The relay device 30 notifies the base station device 20 of the eMBB resource used for URLLC. The transmission controller 233 in the base station device 20 executes eMBB communication control for reducing the amount of transmission power of the eMBB resource overlapping the URLLC, among the eMBB resources of the downlink backhaul link 51B. In the eMBB communication control, not only the transmission power amount of the eMBB resource overlapping the URLLC is reduced, but also the transmission of the eMBB resource overlapping the URLLC may be stopped. Appropriate change can be made. As a result, interference with URLLC caused by the eMBB transmission can be reduced to thereby improve the reliability of reception of URLLC. Then, even if eMBB and URLLC are communicated by in-band full-duplex communication, it is possible to shorten the delay time caused by the wait for transmission of URLLC as in the related art.

The notification unit 232 in the base station device 20 notifies the relay device 30, which is a reception destination of the eMBB, of the eMBB resource overlapping the URLLC. As a result, the relay device 30 can recognize the difference in reception power of the eMBB having overlapped URLLC, thereby improving the decoding quality.

<4-6. Notification Method of eMBB Resource in Assumed System 1C>

In the base station device 20 of the assumed system 1C illustrated in FIG. 12, for example, there is a pre-action as a method of notifying the relay device 30 that is a reception destination of the eMBB, of the eMBB resource of the downlink backhaul link 51B overlapping the URLLC of the downlink access link 52B.

<Pre-Action>

In the pre-action, the notification unit 232 in the base station device 20 notifies the relay device 30 of an eMBB resource candidate possibly scheduled as URLLC. As a method by which the base station device 20 notifies the relay device 30 of the eMBB resource candidate, RRC signaling may be used. In the case of using the resource possibly scheduled as URLLC in the eMBB, the transmission controller 233 in the base station device 20 executes eMBB communication control to reduce at least the transmission power of eMBB of the resource. However, since the relay device 30 can recognize the resource candidate of the eMBB in advance by the pre-action of the base station device 20, it is possible to avoid a situation in which the eMBB overlapping URLLC cannot be received.

<Post-Action>

In the case of the post-action, for example, since the portion of eMBB having overlapped the URLLC is likely to be erroneous, the notification unit 232 in the base station device 20 notifies the relay device 30 of the acknowledgement (ACK)/negative acknowledgement (NACK) of the downlink backhaul link 51B of the eMBB. As a result, the relay device 30 can recognize the resource of the eMBB having overlapped URLLC on the basis of the ACK/NACK.

<4-7. eMBB Communication Control in Assumed System 1D>

The relay device 30 in the assumed system 1D illustrated in FIG. 13 receives URLLC from the base station device 20 using the downlink backhaul link 51B and transmits eMBB to the terminal device 40 using the downlink access link 52B.

The relay device 30 sets a part of the eMBB resource of the downlink access link 52B as a URLLC resource. The communication unit 341 in the relay device 30 receives the URLLC from the base station device 20 in the downlink backhaul link 51B using the resource partially overlapping the resource of the eMBB of the downlink access link 52B.

The transmission controller 343 in the relay device 30 performs eMBB communication control for reducing the amount of transmission power of the eMBB resource of the downlink access link 52B overlapping the URLLC of the downlink backhaul link 51B. In the eMBB communication control, not only the transmission power amount of the eMBB resource overlapping the URLLC is reduced, but also the transmission of the eMBB resource overlapping the URLLC may be stopped. Appropriate change can be made. As a result, interference with URLLC caused by the eMBB transmission can be reduced, thereby improving the reliability of reception of URLLC.

<4-8. Notification Method of eMBB Resource in Assumed System 1D>

The relay device 30 in the assumed system 1D illustrated in FIG. 13 uses, for example, pre-action, in-progress action, and post-action as methods for notifying the terminal device 40 that is a reception destination of eMBB, of the eMBB resource overlapping URLLC.

<Pre-Action>

In the pre-action, the notification unit 342 in the relay device 30 notifies the terminal device 40 that is a reception destination of the eMBB, of a resource candidate of the eMBB in the downlink access link 52B possibly scheduled as URLLC of the downlink backhaul link 51B. As a method by which the relay device 30 notifies the terminal device 40 of the eMBB resource candidate, for example, RRC signaling may be used. In the case of using the resource possibly scheduled as URLLC in the eMBB, the transmission controller 343 in the relay device 30 executes eMBB communication control to reduce at least the transmission power of eMBB of the resource. Then, since the terminal device 40 can recognize the resource candidate of the eMBB in advance by the pre-action of the relay device 30, it is possible to avoid a situation in which the eMBB overlapping URLLC cannot be received.

<In-Progress Action>

In the in-progress action, the notification unit 342 in the relay device 30 notifies the terminal device 40 of the resource of the eMBB overlapping the URLLC of the downlink backhaul link 51B, by the PDSCH of the downlink access link 52B. The terminal device 40 monitors the PDSCH of the downlink access link 52B of the eMBB overlapping the URLLC. Then, on the basis of the monitoring result of the PDSCH, the terminal device 40 can recognize that the transmission power amount of the eMBB of the resource overlapping URLLC is decreased or the eMBB is not transmitted in the relay device 30.

The terminal device 40 can recognize the resource of the eMBB overlapping the URLLC by using the DMRS reception power of the PDSCH of the downlink access link 52B of the eMBB.

The notification unit 342 in the relay device 30 notifies the terminal device 40 of the eMBB resource overlapping URLLC in the DMRS sequence of the PDSCH of the downlink access link 52B of the eMBB, instead of the DMRS reception power of the PDSCH. The terminal device 40 can designate the eMBB resource overlapping URLLC and/or the transmission power of the eMBB, on the basis of the information associated with the DMRS sequence. Since the terminal device 40 can recognize the eMBB resource overlapping URLLC from the monitoring result of the PDSCH, it is possible to avoid a situation in which the eMBB overlapping URLLC cannot be received.

<Post-Action>

In the post-action, the notification unit 342 in the relay device 30 notifies the terminal device 40, which is a reception destination of the eMBB, of the eMBB resource of the downlink access link 52B having overlapped the URLLC of the downlink backhaul link 51B. As a method of notifying the terminal device 40 of the eMBB resources having overlapped the URLLC, the relay device 30 uses, for example, a UE common DCI or a UE individual DCI. The UE common DCI is a common DCI in the terminal device 40, whereas the UE individual DCI is an individual DCI in the terminal device 40.

The notification unit 342 in the relay device 30 notifies the terminal device 40 of the eMBB resource having overlapped the URLLC using the UE common DCI. The UE common DCI may be an interrupted transmission indicator notified in DCI format 2-1, and can be changed as appropriate. Therefore, the terminal device 40 can recognize the resource of the eMBB having overlapped the URLLC with reference to the UE common DCI.

In addition, the relay device 30 notifies the terminal device 40 of the eMBB resource having overlapped the URLLC, using the UE individual DCI instead of the UE common DCI. The UE individual DCI has a field for notifying the scheduling DCI of another PDSCH, of the resource. Therefore, the terminal device 40 can recognize the resource of the eMBB having overlapped the URLLC with reference to the UE individual DCI. As a result, the terminal device 40 can recognize the eMBB resource from the relay device 30.

5. URLLC COMMUNICATION CONTROL

<5-1. Boosting URLLC Transmission Power>

The node transmitting URLLC temporarily boosts the transmission power of the URRLC according to scheduling information and a boost instruction from the parent node. For example, in a case where the node transmitting the URLLC is the relay device 30 as illustrated in FIG. 14, the relay device 30 temporarily boosts the transmission power of the URRLC according to the scheduling information and the boost instruction from the base station device 20 that is the parent node. For example, in a case where the node transmitting the URLLC is the terminal device 40, the terminal device 40 temporarily boosts the transmission power of the URRLC according to the scheduling information and the boost instruction from the relay device 30 that is the parent node. For example, in a case where the node transmitting the URLLC is the base station device 20 as illustrated in FIG. 15, the base station device 20 temporarily boosts the transmission power of the URRLC.

The instruction for boosting the transmission power includes, for example, an explicit notification and an implicit notification. The explicit notification is, for example, an explicit notification including a boost instruction for increasing transmission power in a field related to power control included in a UL grant. This field may be used as an instruction for lowering transmission power by power control in consideration of self-interference, and can be changed as appropriate.

The implicit notification is an implicit notification that the transmission power may be increased in a case where the URLLC resource is allocated to a resource capable of in-band full-duplex communication. A node receiving an explicit notification or an implicit notification can recognize a boost instruction.

<5-2. URLLC Communication Control in Assumed System 1E>

In the relay device 30 of the assumed system 1E illustrated in FIG. 14, URLLC is transmitted to the base station device 20 in the uplink backhaul link 51A, and eMBB is received from the base station device 20 in the downlink backhaul link 51B. The communication unit 341 in the relay device 30 transmits the URLLC to the base station device 20 in the uplink backhaul link 51A using the resource partially overlapping the resource of the eMBB of the downlink backhaul link 51B. At this time, the relay device 30 that transmits the URLLC temporarily boosts the transmission power of the URRLC according to the scheduling information and the boost instruction from the base station device 20. As a result, the base station device 20 that receives the URLLC can secure the reception quality of the URLLC overlapping the eMBB resource.

The UL (uplink) data transmission can be separated into, for example, grant-based transmission and grant-free transmission. The grant-based transmission is a data transmission scheme that requires dynamic scheduling by DCI from the base station device 20 before data transmission. The grant-free transmission is a data transmission scheme in which data transmission is possible without dynamic scheduling from the base station device 20 before data transmission.

In the grant-based data transmission, there are a case of simultaneously instructing the link control of the downlink backhaul link 51B and the link control of the uplink backhaul link 51A and a case of instructing the link control of the downlink backhaul link 51B after executing the link control of the uplink backhaul link 51A.

In the case of simultaneously instructing the link control of the downlink backhaul link 51B and the link control of the uplink backhaul link 51A, for example, there are a case where they are instructed simultaneously by one DCI and a case where they are instructed individually by the DCI. In the case of individual instruction by the DCI, there are a case where a plurality of individual DCIs is simultaneously received and a case where a two-stage DCI is received.

In the case of instructing the link control of the downlink backhaul link 51B after execution of the link control of the uplink backhaul link 51A, for example, there are a case where the instruction is made before the UL data is transmitted and a case where the instruction is made while the UL data is being transmitted. In the case where the instruction is made while the UL data is being transmitted, the PDCCH is monitored during the UL data transmission.

In the grant-free data transmission for instructing the link control of the downlink backhaul link 51B after the link control of the uplink backhaul link 51A, the grant-free settings are changed between the resource of in-band full-duplex communication and the resource other than the resource of in-band full-duplex communication. The grant-free setting includes, for example, transmission power, MCS, and the number of repetitions.

In a case where the eMBB of the grant-free downlink backhaul link 51B overlaps the URLLC of the grant-free uplink backhaul link 51A, whether the uplink backhaul link 51A may be transmitted in the downlink backhaul link 51B may be indicated by a downlink control signal (DL assignment). Appropriate change can be made.

<5-3. URLLC Communication Control in Assumed System 1F>

In the relay device 30 of the assumed system 1F illustrated in FIG. 15, eMBB is transmitted to the base station device 20 in the uplink backhaul link 51A, and URLLC is received from the base station device 20 in the downlink backhaul link 51B. The communication unit 341 in the relay device 30 transmits the URLLC to the base station device 20 in the downlink backhaul link 51B using the resource partially overlapping the resource of the eMBB of the uplink backhaul link 51A. At this time, the base station device 20 transmitting the URLLC temporarily boosts the transmission power of the URRLC. As a result, the relay device 30 receiving the URLLC can secure the reception quality of the URLLC overlapping the eMBB resource.

6. MODIFICATIONS

The above-described embodiments are examples, and various modifications and applications are possible.

In the above embodiments, for example, the relay device 30 wirelessly connected to the backhaul link 51 and wirelessly connected to the access link 52 is exemplified. However, wireless connection to the links is not limited to the relay device 30 but may be applied to the base station device 20 or the terminal device 40, for example.

For convenience of description, eMBB has been exemplified as the first communication mode, and URLLC has been exemplified as the second communication mode. However, the first communication mode and the second communication mode are not limited thereto, and can be appropriately changed.

As methods of notifying the eMBB reception destination of the eMBB resources overlapping URLLC, various forms have been exemplified in <4. eMBB Communication Control>. However, only one of the methods may be applied, or a plurality of methods may be combined. Appropriate change can be made.

The above-described embodiments are also applicable to, for example, sidelink communication such as Device to Device.

The processes described in relation to the above embodiments (the processes described in <4. eMBB Communication Control>) are processes in communication among the base station device 20, the relay device 30, and the terminal device 40. However, the above-described processes are also applicable to communication between the base station device 20 and the relay device 30, communication between the relay device 30 and the terminal device 40, communication between the base station device 20 and the terminal device 40, communication between the relay device 30 and the relay device 30, and communication between the terminal device 40 and the terminal device 40.

The control device that controls the management device 10, the base station device 20, the relay device 30, or the terminal device 40 of the present embodiment may be realized by a dedicated computer system or a general-purpose computer system.

For example, communication programs for executing the above-described operations (for example, transmission/reception processes) are stored and distributed in a computer-readable recording medium such as an optical disk, a semiconductor memory, a magnetic tape, or a flexible disk. Then, for example, the programs are installed in a computer, and the above-described processes are executed to configure the control device. At this time, the control device may be a device (for example, a personal computer) outside the base station device 20, the relay device 30, or the terminal device 40. The control device may be a device (for example, the controller 23, the controller 34, or the controller 45) inside the base station device 20, the relay device 30, or the terminal device 40.

The communication programs may be stored in a disk device included in a server device on a network such as the Internet so that the communication programs can be downloaded to a computer. The above-described functions may be realized by cooperation of an operating system (OS) and application software. In this case, the functions other than the OS may be stored in a medium and distributed, or the functions other than the OS may be stored in a server device and downloaded to a computer or the like.

Among the processes described in relation to the above embodiments, all or some of the processes described as being performed automatically can be performed manually, or all or some of the processes described as being performed manually can be performed automatically by a publicly known method. The processing procedures, specific names, and information including various data and parameters illustrated in the specification and the drawings can be arbitrarily changed unless otherwise specified. For example, the various types of information illustrated in the drawings are not limited to the illustrated information.

The respective components of the devices illustrated in the drawings are functionally conceptual, and are not necessarily physically configured as illustrated in the drawings. That is, specific forms of distribution and integration of the devices are not limited to the illustrated forms, and all or some thereof can be functionally or physically distributed or integrated in arbitrary units according to various loads, usage conditions, and the like.

The above-described embodiments can be appropriately combined as far as the processes do not contradict each other. The orders of steps illustrated in the flowcharts and the sequence diagrams of the above-described embodiments can be changed as appropriate.

For example, the present embodiment can be implemented in any structure constituting an apparatus or a system, for example, a processor as a system large scale integration (LSI) or the like, a module using a plurality of processors or the like, a unit using a plurality of modules or the like, or a set of a unit and other functions added to the unit or the like (that is, a structure of a part of the device).

In the present embodiment, the system means a set of a plurality of components (devices, modules (parts), and the like), and it does not matter whether all the components are in the same housing. Therefore, a plurality of devices housed in separate housings and connected via a network and one device in which a plurality of modules is housed in one housing are both systems.

For example, the present embodiment can take a configuration of cloud computing in which one function is shared and processed by a plurality of devices in cooperation via a network.

7. CONCLUSION

As described above, according to an embodiment of the present disclosure, while wirelessly communicating in a first communication mode (for example, eMBB) using a first resource of a predetermined frequency channel, a communication device (for example, the relay device 30) wirelessly communicates in a second communication mode (for example, URLLC) in which a lower delay is required than in the first communication mode using a second resource at least partially overlapping the first resource on a frequency axis and a time axis, and notifies a reception destination in the first communication mode, of the second resource.

The communication device notifies the reception destination in the first communication mode of the second resource overlapping the first resource. As a result, not only the requirement of the second communication mode in which low delay is required can be satisfied, but also the reception destination of the first communication mode that overlaps the second resource of the second communication mode can recognize the second resource overlapping the first resource.

Although the embodiments of the present disclosure have been described above, the technical scope of the present disclosure is not limited to only the above-described embodiments, and various modifications can be made without departing from the gist of the present disclosure. The components of different embodiments and modifications may be appropriately combined.

The advantageous effects of each embodiment described in the present specification are merely examples and are not limited, and other advantageous effects may be provided.

The present technology can also have the following configurations.

(1)
A communication device comprising:
a communication unit that, while wirelessly communicating in a first communication mode using a first resource of a predetermined frequency channel, wirelessly communicates in a second communication mode in which a lower delay is required than in the first communication mode using a second resource at least partially overlapping the first resource on a frequency axis and a time axis; and
a notification unit that notifies a reception destination in the first communication mode, of the second resource.

(2)
The communication device according to (1), wherein
before the wireless communication in the second communication mode by the communication unit while wirelessly communicating in the first communication mode, the notification unit
notifies the reception destination of a candidate for the second resource that is likely to be used for the wireless communication in the second communication mode.

(3)
The communication device according to (1), wherein
during the wireless communication in the second communication mode by the communication unit while wirelessly communicating in the first communication mode, the notification unit
notifies the reception destination of the second resource being used for the wireless communication in the second communication mode, in accordance with a change of reception state in the first communication mode.

(4)
The communication device according to (1), wherein
after the wireless communication in the second communication mode by the communication unit while wirelessly communicating in the first communication mode, the notification unit
notifies the reception destination of the second resource that has been used for the wireless communication in the second communication mode.

(5)
The communication device according to (1), wherein
before the wireless communication in the second communication mode by the communication unit while wirelessly communicating in the first communication mode, the notification unit
notifies, by a control channel, the reception destination of a candidate for the second resource that is likely to be used for the wireless communication in the second communication mode.

(6)
The communication device according to (1), wherein
during the wireless communication in the second communication mode by the communication unit while wirelessly communicating in the first communication mode, the notification unit
notifies the reception destination of the second resource being used for the wireless communication in the second communication mode, in accordance with a change of reception state in the first communication mode received by a data channel.

(7)
The communication device according to (6), wherein
the notification unit
notifies the reception destination of the second resource being used for the wireless communication in the second communication mode by using information related to a demodulation reference signal in the data channel.

(8)
The communication device according to (1), wherein after the wireless communication in the second communication mode by the communication unit while wirelessly communicating in the first communication mode, the notification unit
notifies, by a control channel, the reception destination of the second resource that has been used for the wireless communication in the second communication mode.

(9)
The communication device according to (8), wherein
the notification unit
notifies the reception destination of the second resource that has been used for the wireless communication in the second communication mode by using bit information in the control channel.

(10)
The communication device according to any one of (1) to (9), further comprising
a transmission controller that, when the communication unit wirelessly communicates in the second communication mode while wirelessly communicating in the first communication mode, controls transmission power of the first communication mode of the first resource overlapping the second resource or transmission power of the second communication mode of the second resource.

The communication device according to (10), wherein
the transmission controller
controls to decrease transmission power of the first communication mode of the first resource overlapping the second resource.

(12)
The communication device according to (10), wherein
the transmission controller
controls to increase transmission power of the second communication mode of the second resource.

(13)
A communication method executed by a communication device, the communication method comprising:
while wirelessly communicating in a first communication mode using a first resource of a predetermined frequency channel, wirelessly communicating in a second communication mode in which a lower delay is required than in the first communication mode using a second resource at least partially overlapping the first resource on a frequency axis and a time axis; and
notifying a reception destination in the first communication mode, of the second resource.

(14)
A communication program for causing a computer included in a communication device to function as:
a communication unit that, while wirelessly communicating in a first communication mode using a first resource of a predetermined frequency channel, wirelessly communicates in a second communication mode in which a lower delay is required than in the first communication mode using a second resource at least partially overlapping the first resource on a frequency axis and a time axis; and
a notification unit that notifies a reception destination in the first communication mode, of the second resource.

(15)

A communication system including: a base station device; a relay device that wirelessly communicates with the base station device via a first wireless link; and a terminal device that wirelessly communicates with the relay device via a second wireless link, in which the relay device includes:
a communication unit that, while wirelessly communicating in a first communication mode using a first resource of a predetermined frequency channel, wirelessly communicates in a second communication mode in which a lower delay is required than in the first communication mode using a second resource at least partially overlapping the first resource on a frequency axis and a time axis; and
a notification unit that notifies the base station device or the terminal device that is a reception destination in the first communication mode, of the second resource.

REFERENCE SIGNS LIST

1 COMMUNICATION SYSTEM
10 MANAGEMENT DEVICE
20 BASE STATION DEVICE
30 RELAY DEVICE
40 TERMINAL DEVICE
11 COMMUNICATION UNIT
21, 31, 41 SIGNAL PROCESSOR
12, 22, 32, 42 STORAGE UNIT
13, 23, 34, 45 CONTROLLER
33, 43 NETWORK COMMUNICATION UNIT
44 INPUT/OUTPUT UNIT
211, 311, 411 RECEPTION PROCESSOR
211a, 411a WIRELESS RECEPTION UNIT
211b, 411b DEMULTIPLEXING UNIT
211c, 411c DEMODULATION UNIT
211d, 411d DECODING UNIT
212, 312, 412 TRANSMISSION PROCESSOR
212a, 412a ENCODING UNIT
212b, 412b MODULATION UNIT
212c, 412c MULTIPLEXING UNIT
212d, 412d WIRELESS TRANSMISSION UNIT
213, 313, 413 ANTENNA
231, 451 COMMUNICATION UNIT
232, 452 NOTIFICATION UNIT
233, 453 TRANSMISSION CONTROLLER

The invention claimed is:

1. A communication device, comprising:
circuitry configured to:
wirelessly communicate in a first communication mode based on a first resource of a frequency channel;
wirelessly communicate in a second communication mode based on a second resource that at least partially overlaps the first resource on a frequency axis and a time axis, wherein
the wireless communication in the second communication mode occurs along with the wireless communication in the first communication mode, and
a delay required in the second communication mode is lower than a delay required in the first communication mode; and
notify a reception destination of the second resource in the first communication mode, wherein
during the wireless communication in the second communication mode along with the wireless communication in the first communication mode, the reception destination of the second resource that is used for the wireless communication in the second communication mode is notified based on a change of reception state in the first communication mode.

2. The communication device according to claim 1, wherein
before the wireless communication in the second communication mode along with the wireless communication in the first communication mode, the circuitry is further configured to notify the reception destination of a candidate for the second resource to be used for the wireless communication in the second communication mode.

3. The communication device according to claim 1, wherein
after the wireless communication in the second communication mode along with the wireless communication in the first communication mode, the circuitry is further configured to notify the reception destination of the second resource used for the wireless communication in the second communication mode.

4. The communication device according to claim 1, wherein
before the wireless communication in the second communication mode along with the wireless communication in the first communication mode, the circuitry is further configured to notify, based on a control channel, the reception destination of a candidate for the second resource to be used for the wireless communication in the second communication mode.

5. The communication device according to claim 1, wherein
during the wireless communication in the second communication mode along with the wireless communication in the first communication mode, the circuitry is further configured to notify the reception destination of the second resource that is used for the wireless communication in the second communication mode based on the change of the reception state in the first communication mode received by a data channel.

6. The communication device according to claim 5, wherein the circuitry is further configured to
notify the reception destination of the second resource that is used for the wireless communication in the second communication mode based on information related to a demodulation reference signal in the data channel.

7. The communication device according to claim 1, wherein
after the wireless communication in the second communication mode along with the wireless communication in the first communication mode, the circuitry is further configured to notify, based on a control channel, the reception destination of the second resource used for the wireless communication in the second communication mode.

8. The communication device according to claim 7, wherein the circuitry is further configured to
notify the reception destination of the second resource used for the wireless communication in the second communication mode based on bit information in the control channel.

9. The communication device according to claim 1, wherein
based on the wireless communication in the second communication mode along with the wireless communication in the first communication mode, the circuitry is further configured to control one of a first transmission power of the first communication mode of the first resource that overlaps the second resource or a second transmission power of the second communication mode of the second resource.

10. The communication device according to claim 9, wherein
the circuitry is further configured to decrease the first transmission power of the first communication mode of the first resource that overlaps the second resource.

11. The communication device according to claim 9, wherein
the circuitry is further configured to increase the second transmission power of the second communication mode of the second resource.

12. A communication method executed by a communication device, the communication method comprising:
wirelessly communicating in a first communication mode based on a first resource of a predetermined-frequency channel;
wirelessly communicating in a second communication mode based on a second resource at least partially overlapping the first resource on a frequency axis and a time axis, wherein
the wireless communication in the second communication mode occurs along with the wireless communication in the first communication mode, and
a delay required in the second communication mode is lower than a delay required in the first communication mode; and
notifying a reception destination the second resource in the first communication mode, wherein
during the wireless communication in the second communication mode along with the wireless communication in the first communication mode, the reception destination of the second resource that is used for the wireless communication in the second communication mode is notified based on a change of reception state in the first communication mode.

* * * * *